US012770763B2

(12) United States Patent
Ooshima et al.

(10) Patent No.: US 12,770,763 B2
(45) Date of Patent: Oct. 20, 2026

(54) ELECTRONIC COMPONENT

(71) Applicant: Murata Manufacturing Co., Ltd., Nagaokakyo (JP)

(72) Inventors: Tomoya Ooshima, Nagaokakyo (JP); Yuuta Hoshino, Nagaokakyo (JP); Koichi Yamada, Nagaokakyo (JP); Miki Sasaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 511 days.

(21) Appl. No.: 18/475,734

(22) Filed: Sep. 27, 2023

(65) Prior Publication Data

US 2024/0021347 A1 Jan. 18, 2024

Related U.S. Application Data

(63) Continuation of application No. PCT/JP2022/016024, filed on Mar. 30, 2022.

(30) Foreign Application Priority Data

Jun. 15, 2021 (JP) ................................ 2021-099719

(51) Int. Cl.
*H01C 7/04* (2006.01)
*H01C 1/14* (2006.01)

(52) U.S. Cl.
CPC ............ *H01C 7/04* (2013.01); *H01C 1/1413* (2013.01)

(58) Field of Classification Search
CPC ......... H01C 7/04; H01C 1/1413; H01F 27/29; H01F 27/32; H01G 4/1227; H01G 4/129
See application file for complete search history.

(56) References Cited

U.S. PATENT DOCUMENTS

| | | | | |
|---|---|---|---|---|
| 6,232,867 | B1 * | 5/2001 | Yoshida | H01C 17/285 338/21 |
| 10,575,404 | B2 * | 2/2020 | Yoshida | H01C 1/148 |
| 2017/0076867 | A1 * | 3/2017 | Okai | H01G 4/30 |
| 2021/0166846 | A1 | 6/2021 | Yonezawa et al. | |

FOREIGN PATENT DOCUMENTS

| | | | |
|---|---|---|---|
| JP | S5280448 | A | 7/1977 |
| JP | 2001135501 | A | 5/2001 |
| JP | 2007242995 | * | 9/2007 |
| JP | 2010027730 | A | 2/2010 |
| JP | 5267511 | B2 | 8/2013 |
| JP | 2013197509 | * | 9/2013 |
| JP | 2019114586 | A | 7/2019 |
| JP | 2020036002 | A | 3/2020 |
| WO | 2020040197 | A1 | 2/2020 |

OTHER PUBLICATIONS

JP-2007242995 machine translation (Year: 2007).*
JP-2013197509 machine translation (Year: 2013).*
International Search Report in PCT/JP2022/016024, mailed Jun. 28, 2022, 3 pages.

* cited by examiner

*Primary Examiner* — Kyung S Lee
(74) *Attorney, Agent, or Firm* — ArentFox Schiff LLP

(57) ABSTRACT

An electronic component that includes: a base body; and an insulating film covering an outer surface of the base body. The insulating film includes the film main body and a plurality of the thick film portions. A material of the film main body includes a glass. A material of the thick film portion is the same as the glass of the film main body. A thickness of the thick film portion is larger than an average thickness of the film main body.

14 Claims, 10 Drawing Sheets

| | AVERAGE THICKNESS OF FILM MAIN BODY [nm] | FILM THICK PORTION | | | AVERAGE THICKNESS OF FILM MAIN BODY/MAXIMUM THICKNESS OF FILM THICK PORTION | MICROSCRATCH | CHIP AND CRACK TEST |
|---|---|---|---|---|---|---|---|
| | | MAXIMUM THICKNESS [nm] | MAXIMUM WIDTH [nm] | MAXIMUM WIDTH/ MAXIMUM THICKNESS | | | |
| EXAMPLE 1 | 59 | 183 | 143 | 0.78 | 0.32 | ○ | ○ |
| EXAMPLE 2 | 62 | 171 | 500 | 2.92 | 0.36 | ○ | ○ |
| EXAMPLE 3 | 63 | 286 | 1140 | 3.98 | 0.22 | ○ | ○ |
| EXAMPLE 4 | 105 | 116 | 289 | 2.49 | 0.90 | ○ | ○ |
| EXAMPLE 5 | 250 | 520 | 967 | 1.86 | 0.48 | ○ | ○ |
| EXAMPLE 6 | 500 | 801 | 1770 | 2.21 | 0.62 | ○ | ○ |
| EXAMPLE 7 | 1000 | 1300 | 4550 | 3.50 | 0.76 | ○ | ○ |
| COMPARATIVE EXAMPLE | 50 | 500 | 750 | 1.50 | 0.10 | × | × |

ELECTRONIC COMPONENT

CROSS REFERENCE TO RELATED APPLICATIONS

The present application is a continuation of International application No. PCT/JP2022/016024, filed Mar. 30, 2022, which claims priority to Japanese Patent Application No. 2021-099719, filed Jun. 15, 2021, the entire contents of each of which are incorporated herein by reference.

TECHNICAL FIELD

The present invention relates to an electronic component.

BACKGROUND ART

An electronic component described in Patent Document 1 includes a base body, an insulating film covering an outer surface of the base body, and ceramic particles distributed on a surface of the insulating film. A material of the insulating film is glass.

Patent Document 1: Japanese Patent No. 5267511

SUMMARY OF THE INVENTION

In the electronic component as described in Patent Document 1, some of the plurality of ceramic particles protrude from the surface of the insulating film. Therefore, depending on an amount of protrusion of the ceramic particles from the outer surface of the insulating film and a size of a contact range between the ceramic particles and the insulating film, the ceramic particles may fall off from the insulating film. A recess is then formed in the insulating film at a position where the ceramic particles fall off. When such a recess is formed, a crack may occur in the insulating film starting from the recess.

In order to solve the above problems, the present description provides an electronic component including: a base body; and an insulating film covering an outer surface of the base body, in which the insulating film includes a film main body and a plurality of thick film portions buried in the film main body, a material of the film main body includes a glass, a material of the thick film portion is the same as the glass of the film main body, and a thickness of the thick film portion is larger than an average thickness of the film main body.

According to the above configuration, since the thick film portion and the film main body are made of the same material, the thick film portion and the film main body do not have a clear boundary. Thus, falling off of the thick film portion from the film main body can be suppressed.

Falling off of the thick film portion from the film main body can be suppressed.

DETAILED DESCRIPTION OF THE INVENTION

One Embodiment of Electronic Component

Figure 1:
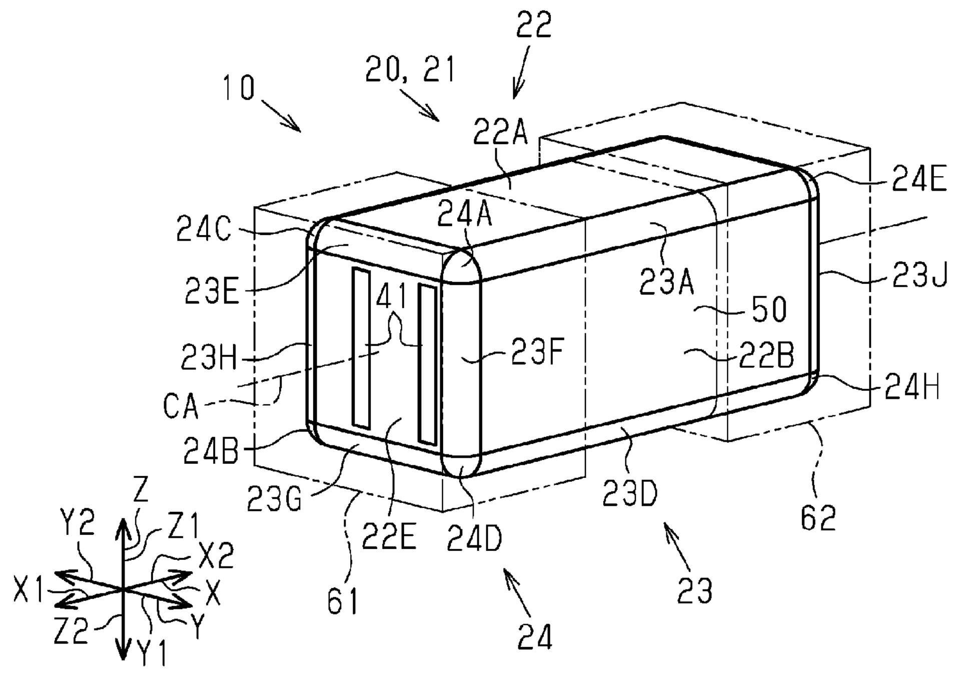
FIG. 1 is a perspective view of an electronic component.

Hereinafter, an embodiment of an electronic component will be described with reference to the drawings. In the drawings, sometimes a component is illustrated while enlarged for the sake of easy understanding. In some cases, a dimension ratio of the component differs from an actual dimension ratio or a dimension ratio of another drawing.

(Overall Configuration)

As shown in FIG. 1, an electronic component 10 is, for example, a surface mount negative characteristic thermistor component mounted on a circuit board or the like. The negative characteristic thermistor component has a characteristic that the resistance value decreases as the temperature increases.

The electronic component 10 includes a base body 20. The base body 20 has a substantially quadrangular prism shape and has a central axis CA. Hereinafter, an axis extending along the central axis CA is defined as a first axis X. One of axes orthogonal to the first axis X is defined as a second axis Y. An axis orthogonal to both the first axis X and the second axis Y is defined as a third axis Z. One of the directions along the first axis X is defined as a first positive direction X1, and the direction opposite to the first positive direction X1 among the directions along the first axis X is defined as a first negative direction X2. One of the directions along the second axis Y is defined as a second positive direction Y1, and the direction opposite to the second positive direction Y1 among the directions along the second axis Y is defined as a second negative direction Y2. In addition, one of the directions along the third axis Z is defined as a third positive direction Z1, and the direction opposite to the third positive direction Z1 among the directions along the third axis Z is defined as a third negative direction Z2.

An outer surface 21 of the base body 20 has six planar surfaces 22. Hereinafter, when the six surfaces 22 are distinguished, they are respectively referred to as a first surface 22A, a second surface 22B, a third surface 22C, a fourth surface 22D, a fifth surface 22E, and a sixth surface 22F.

The first surface 22A is a plane orthogonal to the third axis Z. The first surface 22A faces the third positive direction Z1. Thus, the first surface 22A expands in a direction along the first axis X and the second axis Y. That is, the first surface 22A extends parallel to the first axis X.

The second surface 22B is a plane orthogonal to the second axis Y. The second surface 22B faces the second positive direction Y1. Thus, the second surface 22B expands in a direction along the first axis X and the third axis Z. That is, the second surface 22B extends parallel to the first axis X. Among angles formed by the second surface 22B and the first surface 22A, the angle on the base body 20 side is 90 degrees.

Figure 2:
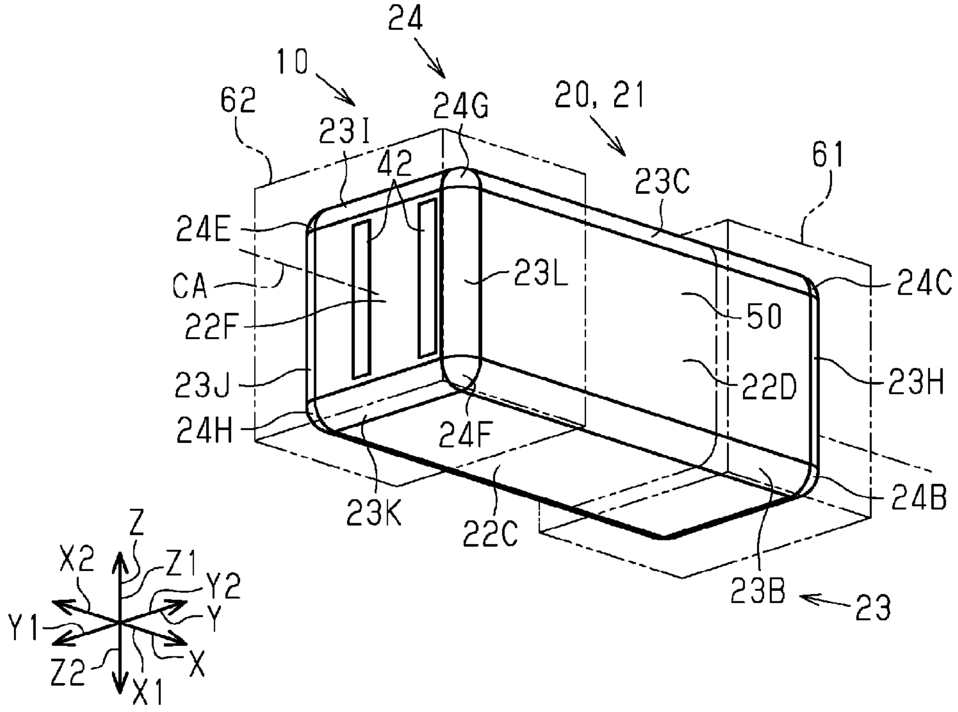
FIG. 2 is a perspective view of the electronic component.

As illustrated in FIG. 2, the third surface 22C is a plane orthogonal to the third axis Z. The third surface 22C faces the third negative direction Z2. Thus, the third surface 22C expands in the direction along the first axis X and the second axis Y. The third surface 22C is parallel to the first surface 22A. That is, the third surface 22C extends parallel to the first axis X. Among angles formed by the third surface 22C and the second surface 22B, the angle on the base body 20 side is 90 degrees.

The fourth surface 22D is a plane orthogonal to the second axis Y. The fourth surface 22D faces the second negative direction Y2. Thus, the fourth surface 22D expands in the direction along the first axis X and the third axis Z. The fourth surface 22D is parallel to the second surface 22B. That is, the fourth surface 22D extends parallel to the first axis X. Among angles formed by the fourth surface 22D and the third surface 22C, the angle on the base body 20 side is 90 degrees. In addition, among angles formed by the first surface 22A and the fourth surface 22D, the angle on the base body 20 side is 90 degrees.

As illustrated in FIG. 1, the fifth surface 22E is a plane orthogonal to the first axis X. The fifth surface 22E faces the first positive direction X1. Thus, the fifth surface 22E expands in a direction along the second axis Y and the third axis Z. Among angles formed by the fifth surface 22E and the first surface 22A to the fourth surface 22D, all the angles on the base body 20 side are 90 degrees.

As illustrated in FIG. 2, the sixth surface 22F is a plane orthogonal to the first axis X. The sixth surface 22F faces the first negative direction X2. Thus, the sixth surface 22F expands in the direction along the second axis Y and the third axis Z. Among angles formed by the sixth surface 22F and the first surface 22A to the fourth surface 22D, all the angles on the base body 20 side are 90 degrees.

As illustrated in FIG. 1, the outer surface 21 of the base body 20 has 12 boundary surfaces 23. The boundary surface 23 includes a curved surface existing at a boundary between the adjacent surfaces 22. That is, the boundary surface 23 includes, for example, a curved surface formed by round chamfering a corner formed by adjacent surfaces 22.

Hereinafter, when the 12 boundary surfaces 23 are distinguished, they are respectively referred to as a first boundary surface 23A, a second boundary surface 23B, . . . , and a twelfth boundary surface 23L.

The first boundary surface 23A is a boundary portion between the first surface 22A and the second surface 22B. Thus, the first surface 22A and the second surface 22B are adjacent to each other with the first boundary surface 23A interposed therebetween. The first boundary surface 23A extends parallel to the first axis X. The first boundary surface 23A has a curved portion in sectional view orthogonal to the first axis X. The curved portion extends in an arc shape at the same distance from a specific point.

As illustrated in FIG. 2, the second boundary surface 23B is a boundary portion between the third surface 22C and the fourth surface 22D. Thus, the third surface 22C and the fourth surface 22D are adjacent to each other with the second boundary surface 23B interposed therebetween. The second boundary surface 23B extends parallel to the first axis X. The second boundary surface 23B has a curved portion in sectional view orthogonal to the first axis X. The curved portion extends in an arc shape at the same distance from a specific point.

The third boundary surface 23C is a boundary portion between the first surface 22A and the fourth surface 22D. Thus, the first surface 22A and the fourth surface 22D are adjacent to each other with the third boundary surface 23C interposed therebetween. The third boundary surface 23C extends parallel to the first axis X. The third boundary surface 23C has a curved portion in the sectional view orthogonal to the first axis X. The curved portion extends in an arc shape at the same distance from a specific point.

As illustrated in FIG. 1, the fourth boundary surface 23D is a boundary portion between the second surface 22B and the third surface 22C. Thus, the second surface 22B and the third surface 22C are adjacent to each other with the fourth boundary surface 23D interposed therebetween. The fourth boundary surface 23D extends parallel to the first axis X. The fourth boundary surface 23D has a curved portion in the sectional view orthogonal to the first axis X. The curved portion extends in an arc shape at the same distance from a specific point.

The fifth boundary surface 23E is a boundary portion between the first surface 22A and the fifth surface 22E. Thus, the first surface 22A and the fifth surface 22E are adjacent to each other with the fifth boundary surface 23E interposed therebetween. The fifth boundary surface 23E extends parallel to the second axis Y. The fifth boundary surface 23E has a curved portion in sectional view orthogonal to the second axis Y. The curved portion extends in an arc shape at the same distance from a specific point.

A sixth boundary surface 23F is a boundary portion between the second surface 22B and the fifth surface 22E. Thus, the second surface 22B and the fifth surface 22E are adjacent to each other with the sixth boundary surface 23F interposed therebetween. The sixth boundary surface 23F extends parallel to the third axis Z. The sixth boundary surface 23F has a curved portion in sectional view orthogonal to the third axis Z. The curved portion extends in an arc shape at the same distance from a specific point.

A seventh boundary surface 23G is a boundary portion between the third surface 22C and the fifth surface 22E. Thus, the third surface 22C and the fifth surface 22E are adjacent to each other with the seventh boundary surface 23G interposed therebetween. The seventh boundary surface 23G extends parallel to the second axis Y. The seventh boundary surface 23G has a curved portion in the sectional view orthogonal to the second axis Y. The curved portion extends in an arc shape at the same distance from a specific point.

An eighth boundary surface 23H is a boundary portion between the fourth surface 22D and the fifth surface 22E. Thus, the fourth surface 22D and the fifth surface 22E are adjacent to each other with the eighth boundary surface 23H interposed therebetween. The eighth boundary surface 23H extends parallel to the third axis Z. The eighth boundary surface 23H has a curved portion in the sectional view orthogonal to the third axis Z. The curved portion extends in an arc shape at the same distance from a specific point.

As illustrated in FIG. 2, the ninth boundary surface 23I is a boundary portion between the first surface 22A and the sixth surface 22F. Thus, the first surface 22A and the sixth surface 22F are adjacent to each other with the ninth boundary surface 23I interposed therebetween. The ninth boundary surface 23I extends parallel to the second axis Y. The ninth boundary surface 23I has a curved portion in the sectional view orthogonal to the second axis Y. The curved portion extends in an arc shape at the same distance from a specific point.

A tenth boundary surface 23J is a boundary portion between the second surface 22B and the sixth surface 22F. Thus, the second surface 22B and the sixth surface 22F are adjacent to each other with the tenth boundary surface 23J interposed therebetween. The tenth boundary surface 23J extends parallel to the third axis Z. The tenth boundary surface 23J has a curved portion in the sectional view orthogonal to the third axis Z. The curved portion extends in an arc shape at the same distance from a specific point.

An eleventh boundary surface 23K is a boundary portion between the third surface 22C and the sixth surface 22F. Thus, the third surface 22C and the sixth surface 22F are adjacent to each other with the eleventh boundary surface 23K interposed therebetween. The eleventh boundary surface 23K extends parallel to the second axis Y. The eleventh boundary surface 23K has a curved portion in the sectional view orthogonal to the second axis Y. The curved portion extends in an arc shape at the same distance from a specific point.

A twelfth boundary surface 23L is a boundary portion between the fourth surface 22D and the sixth surface 22F. Thus, the fourth surface 22D and the sixth surface 22F are adjacent to each other with the twelfth boundary surface 23L interposed therebetween. The twelfth boundary surface 23L extends along the third axis Z. The twelfth boundary surface 23L has a curved portion in the sectional view orthogonal to the third axis Z. The curved portion extends in an arc shape at the same distance from a specific point.

As illustrated in FIG. 1, the outer surface 21 of the base body 20 has eight spherical corner surfaces 24. The corner surface 24 is a boundary portion between three adjacent surfaces 22. In other words, the corner surface 24 includes a curved surface at a position where the three boundary surfaces 23 intersect. The corner surface 24 includes, for example, a curved surface formed by round chamfering a corner formed by the three adjacent surfaces 22.

Hereinafter, when the eight corner surfaces 24 are distinguished, the corner surfaces are referred to as a first corner surface 24A, a second corner surface 24B, . . . , and an eighth corner surface 24H, respectively.

The first corner surface 24A is a boundary portion between the first surface 22A, the second surface 22B, and the fifth surface 22E. The first corner surface 24A is a surface of a position where the first boundary surface 23A, the fifth boundary surface 23E, and the sixth boundary surface 23F intersect.

The second corner surface 24B is a boundary portion between the third surface 22C, the fourth surface 22D, and the fifth surface 22E. The second corner surface 24B is a surface of a position where the second boundary surface 23B, the seventh boundary surface 23G, and the eighth boundary surface 23H intersect.

The third corner surface 24C is a boundary portion between the first surface 22A, the fourth surface 22D, and the fifth surface 22E. The third corner surface 24C is a surface of a position where the third boundary surface 23C, the fifth boundary surface 23E, and the eighth boundary surface 23H intersect.

The fourth corner surface 24D is a boundary portion between the second surface 22B, the third surface 22C, and the fifth surface 22E. The fourth corner surface 24D is a surface of a position where the fourth boundary surface 23D, the sixth boundary surface 23F, and the seventh boundary surface 23G intersect.

As illustrated in FIG. 2, the fifth corner surface 24E is a boundary portion between the first surface 22A, the second surface 22B, and the sixth surface 22F. The fifth corner surface 24E is a surface of a position where the first boundary surface 23A, the ninth boundary surface 23I, and the tenth boundary surface 23J intersect.

The sixth corner surface 24F is a boundary portion between the third surface 22C, the fourth surface 22D, and the sixth surface 22F. The sixth corner surface 24F is a surface of a position where the second boundary surface 23B, the eleventh boundary surface 23K, and the twelfth boundary surface 23L intersect.

The seventh corner surface 24G is a boundary portion between the first surface 22A, the fourth surface 22D, and the sixth surface 22F. The seventh corner surface 24G is a surface of a position where the third boundary surface 23C, the ninth boundary surface 23I, and the twelfth boundary surface 23L intersect.

The eighth corner surface 24H is a boundary portion between the second surface 22B, the third surface 22C, and the sixth surface 22F. The eighth corner surface 24H is a surface of a position where the fourth boundary surface 23D, the tenth boundary surface 23J, and the eleventh boundary surface 23K intersect.

Figure 3:
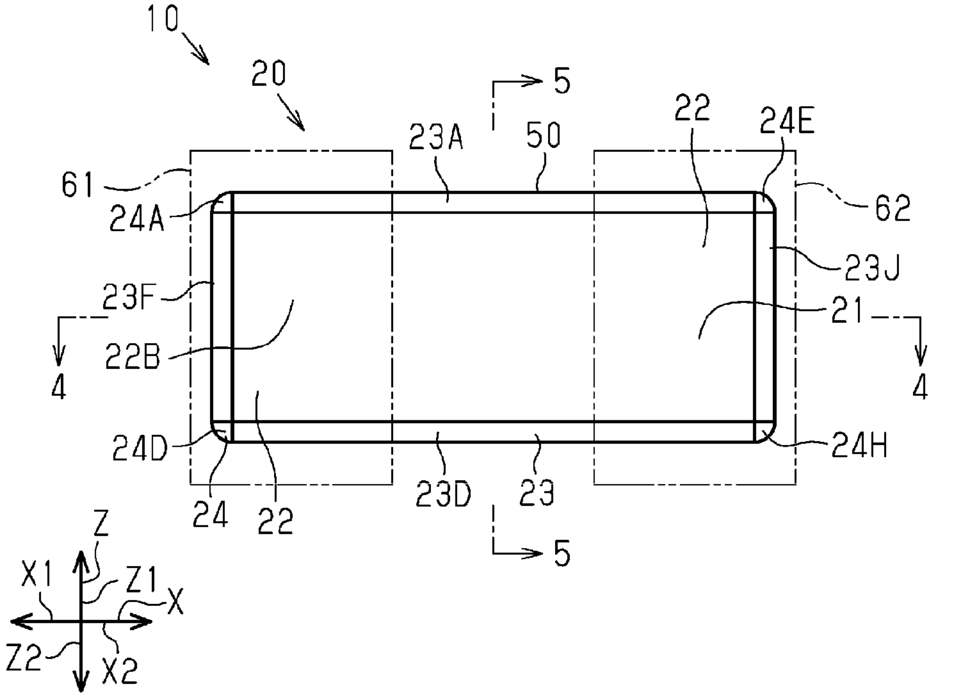
FIG. 3 is a side view of the electronic component.

In FIGS. 1 to 3, a surface of an insulating film 50 to be described later is designated by the same reference numeral as the outer surface 21 of the base body 20.

As illustrated in FIG. 3, in the base body 20, a dimension in the direction along the first axis X is larger than a dimension in the direction along the third axis Z. Furthermore, as illustrated in FIG. 1, in the base body 20, the dimension in the direction along the first axis X is larger than a dimension in the direction along the second axis Y.

The material of the base body 20 is a ceramic obtained by firing a metal oxide containing at least one of Mn, Fe, Ni, Co, Ti, Ba, Al, and Zn as a component.

Figure 4:
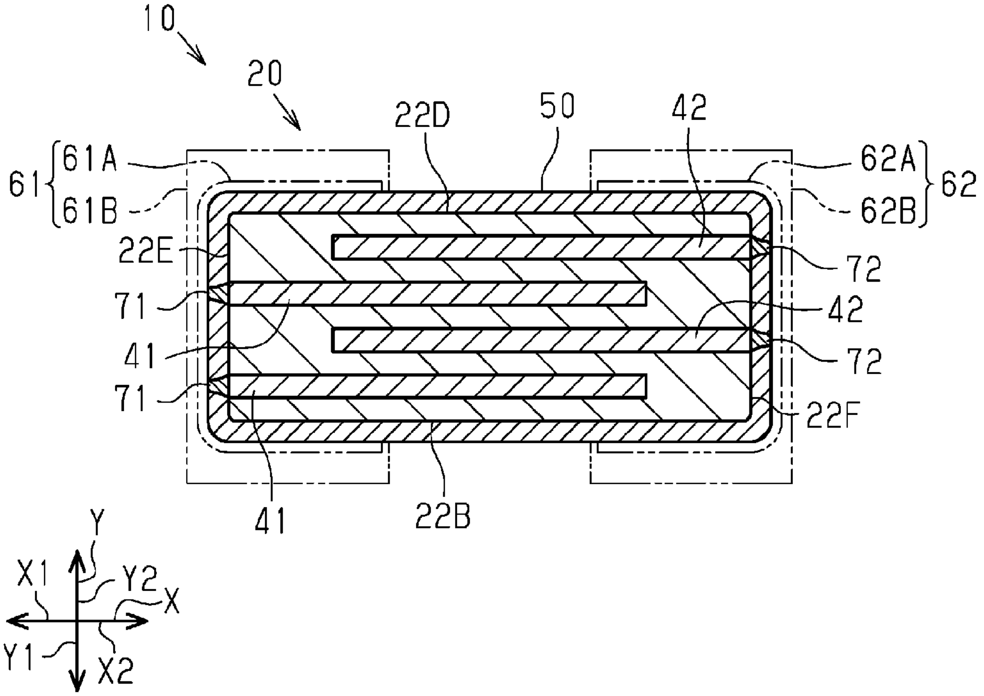
FIG. 4 is a sectional view taken along line 4-4 in FIG. 3.

As illustrated in FIG. 4, the electronic component 10 includes two first internal electrodes 41 and two second internal electrodes 42. The first internal electrode 41 and the second internal electrode 42 are embedded in the base body 20.

The material of the first internal electrode 41 is a conductive material. For example, the material of the first internal electrode 41 is palladium. The material of the second internal electrode 42 is the same as the material of the first internal electrode 41.

The first internal electrode 41 has a rectangular plate shape. A principal surface of the first internal electrode 41 is orthogonal to the second axis Y. The second internal electrode 42 has the same rectangular plate shape as the first internal electrode 41. A principal surface of the second internal electrode 42 is orthogonal to the second axis Y, similarly to the first internal electrode 41.

Figure 5:
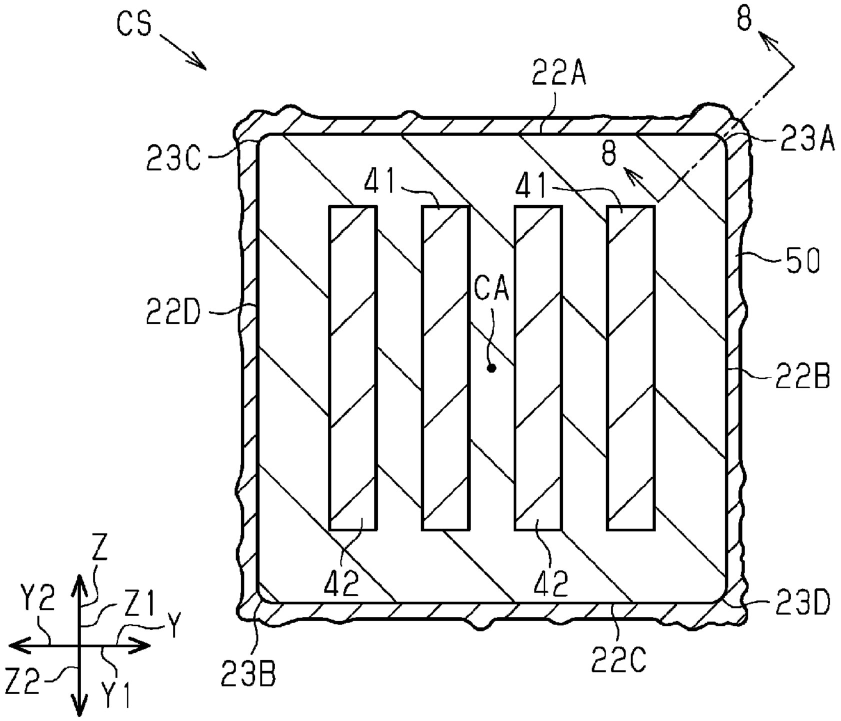
FIG. 5 is a sectional view taken along line 5-5 in FIG. 3.

The dimension of the first internal electrode 41 in the direction along the first axis X is smaller than the dimension of the base body 20 in the direction along the first axis X. As illustrated in FIG. 5, the dimension of the first internal electrode 41 in the direction along the third axis Z is approximately ⅔ of the dimension of the base body 20 in the direction along the third axis Z. The dimension of the second internal electrode 42 in each direction is the same as that of the first internal electrode 41.

As illustrated in FIG. 4, the first internal electrodes 41 and the second internal electrodes 42 are positioned in a staggered manner in the direction along the second axis Y. That is, the first internal electrode 41, the second internal electrode 42, the first internal electrode 41, and the second internal electrode 42 are arranged in this order from the second surface 22B in the second negative direction Y2. In this embodiment, distances between the internal electrodes in the direction along the second axis Y are equal.

As illustrated in FIG. 5, the two first internal electrodes 41 and the two second internal electrodes 42 are both located at the center of the base body 20 in the direction along the third axis Z. On the other hand, as illustrated in FIG. 4, the first internal electrode 41 is close to the first positive direction X1. The second internal electrode 42 is close to the first negative direction X2.

Specifically, an end of the first internal electrode 41 on the first positive direction X1 side coincides with an end of the base body 20 on the first positive direction X1 side. An end of the first internal electrode 41 on the first negative direction X2 side is located inside the base body 20 and does not reach an end of the base body 20 on the first negative direction X2 side. On the other hand, an end of the second internal electrode 42 on the first negative direction X2 side coincides with an end of the base body 20 on the first negative direction X2 side. An end of the second internal electrode 42 on the first positive direction X1 side is located inside the base body 20 and does not reach an end of the base body 20 on the first positive direction X1 side.

As illustrated in FIG. 4, the electronic component 10 includes the insulating film 50. The insulating film 50 covers the outer surface 21 of the base body 20. In the present embodiment, the insulating film 50 covers the entire region of the outer surface 21 of the base body 20.

The electronic component 10 includes a first external electrode 61 and a second external electrode 62. The first external electrode 61 includes a first underlying electrode 61A and a first metal layer 61B. The first underlying electrode 61A is stacked on the insulating film 50 in a part including the fifth surface 22E in the outer surface 21 of the base body 20. Specifically, the first underlying electrode 61A is a five-face electrode that covers the fifth surface 22E of the base body 20 and a portion of the first surface 22A to the fourth surface 22D on the first positive direction X1 side. In this embodiment, the material of the first underlying electrode 61A is silver and glass.

The first metal layer 61B covers the first underlying electrode 61A from the outside. Thus, the first metal layer 61B is stacked on the first underlying electrode 61A. Specifically, the first metal layer 61B has a two-layer structure of nickel plating and tin plating.

The second external electrode 62 includes a second underlying electrode 62A and a second metal layer 62B. The second underlying electrode 62A is stacked on the insulating film 50 in a part including the sixth surface 22F in the outer surface 21 of the base body 20. Specifically, the second underlying electrode 62A is a five-face electrode that covers the sixth surface 22F of the base body 20 and a portion of the first surface 22A to the fourth surface 22D on the first negative direction X2 side. In this embodiment, the material of the second underlying electrode 62A is the same as the material of the first external electrode 61, and is silver and glass.

The second metal layer 62B covers the second underlying electrode 62A from the outside. Thus, the second metal layer 62B is stacked on the second underlying electrode 62A. Specifically, similarly to the first metal layer 61B, the second metal layer 62B has a two-layer structure of nickel plating and tin plating.

The second external electrode 62 does not reach the first external electrode 61 on the first surface 22A to the fourth surface 22D, and is disposed away from the first external electrode 61 in the direction along the first axis X. On the first surface 22A to the fourth surface 22D of the base body 20, the first external electrode 61 and the second external electrode 62 are not stacked in a central portion in the direction along the first axis X, and the insulating film 50 is exposed. In FIGS. 1 to 4, the first external electrode 61 and the second external electrode 62 are indicated by two-dot chain lines.

As illustrated in FIG. 4, the first external electrode 61 and the end of the first internal electrode 41 on the first positive direction X1 side are connected via a first penetrating portion 71 penetrating the insulating film 50.

Although details will be described later, the first penetrating portion 71 is formed by extending palladium constituting the first internal electrode 41 toward the first external electrode 61 in the process of manufacturing the electronic component 10.

The second external electrode 62 and the end of the second internal electrode 42 on the first negative direction X2 side are connected via a second penetrating portion 72 penetrating the insulating film 50. Similarly to the first penetrating portion 71, the second penetrating portion 72 is formed by extending palladium constituting the first internal electrode 41 toward the second external electrode 62 in the process of manufacturing the electronic component 10. In FIG. 4, the first internal electrode 41 and the first penetrating portion 71 are illustrated as separate members having a boundary; however, actually, there is no clear boundary therebetween. In this respect, the same applies to the second penetrating portion 72. In FIGS. 1 and 2, illustration of the first penetrating portion 71 is omitted.

(Insulating Film)

Next, the insulating film 50 will be described in detail.

Figure 6:
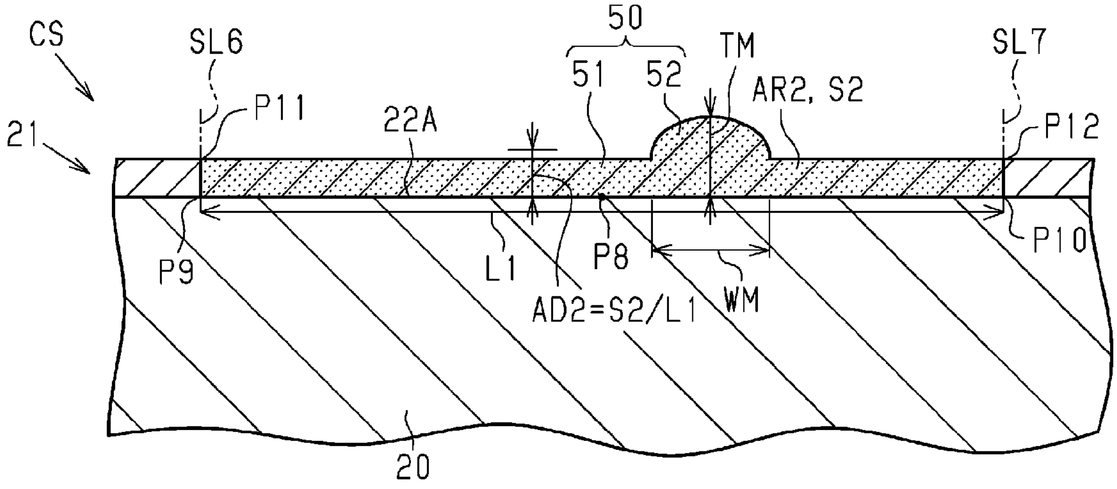
FIG. 6 is an enlarged sectional view of the electronic component.

As illustrated in FIG. 6, the insulating film 50 includes a film main body 51 and a plurality of thick film portions 52. A thickness of the film main body 51 is substantially uniform. A material of the film main body 51 is glass. In the present embodiment, the insulating film 50 contains silicon dioxide as the glass.

The thick film portion 52 is buried in the film main body 51. A material of the thick film portion 52 is the same as the glass of the film main body 51. The thick film portion 52 and the film main body 51 are integrated, and there is no clear boundary therebetween.

In the following description, it is assumed that the thick film portion 52 is not stacked on the film main body 51. That is, when the insulating film 50 is viewed in a direction orthogonal to the outer surface 21 of the base body 20, it is assumed that all positions where the thick film portion 52 exists are constituted by the thick film portion 52. When the insulating film 50 is viewed in the direction orthogonal to the outer surface 21 of the base body 20, it is assumed that all positions where the film main body 51 exists are constituted by the film main body 51.

In each of the thick film portions 52, a portion of the thick film portion 52 protrudes to a side opposite to the base body 20 with respect to the film main body 51. That is, the thickness of the insulating film 50 at the position where the thick film portion 52 exists is larger than an average thickness of the film main body 51. In the present embodiment, the thick film portion 52 has a dome shape as a whole.

The average thickness of the film main body 51 is 30 nm to 1000 nm. The average thickness of the film main body 51 is calculated as an average value of thicknesses measured at points in a range where the thick film portion 52 does not exist. The phrase "the thickness of the film main body 51 is substantially uniform" means that the thickness of the film main body 51 at each position is 10% or less with respect to the average value of the thickness of the film main body 51. That is, a portion of the insulating film 50 larger by more than 10% than the average thickness of the film main body 51 is not the film main body 51 but the thick film portion 52.

The average thickness of the film main body 51 is preferably 0.15 times to 0.91 times an average value of a maximum thickness TM of the thick film portion 52. The maximum thickness TM of the thick film portion 52 is a thickness dimension of the thickest portion of the thickness of one thick film portion 52 in sectional view. The average value of the maximum thickness TM is a value calculated as an average value of the ten maximum thicknesses TM by measuring the maximum thicknesses TM of the ten thick film portions 52.

A maximum width WM of the thick film portion 52 is times to 4.0 times the maximum thickness TM of the thick film portion 52. The maximum width WM of the thick film portion 52 is the largest width dimension of a portion of the thick film portion 52 protruding from the film main body 51 when a dimension in a direction parallel to the outer surface 21 of the base body 20 of the thick film portion 52 is taken as the width dimension in the sectional view.

The maximum thickness TM of at least some of the plurality of thick film portions 52 is preferably less than 6.5 times the average thickness of the film main body. In addition, the maximum thickness TM of all the thick film portions 52 is more preferably less than 6.5 times the average thickness of the film main body.

(Film Thickness of Insulating Film on Boundary Surface)

Next, a method of calculating a first average dimension AD1 will be described. The first average dimension AD1 is the thickness of the insulating film 50 covering the first boundary surface 23A. That is, the first average dimension AD1 is an average value of distances from the first boundary surface 23A to the surface of the insulating film 50 covering the first boundary surface 23A in a direction orthogonal to a tangent of the first boundary surface 23A.

Figure 7:
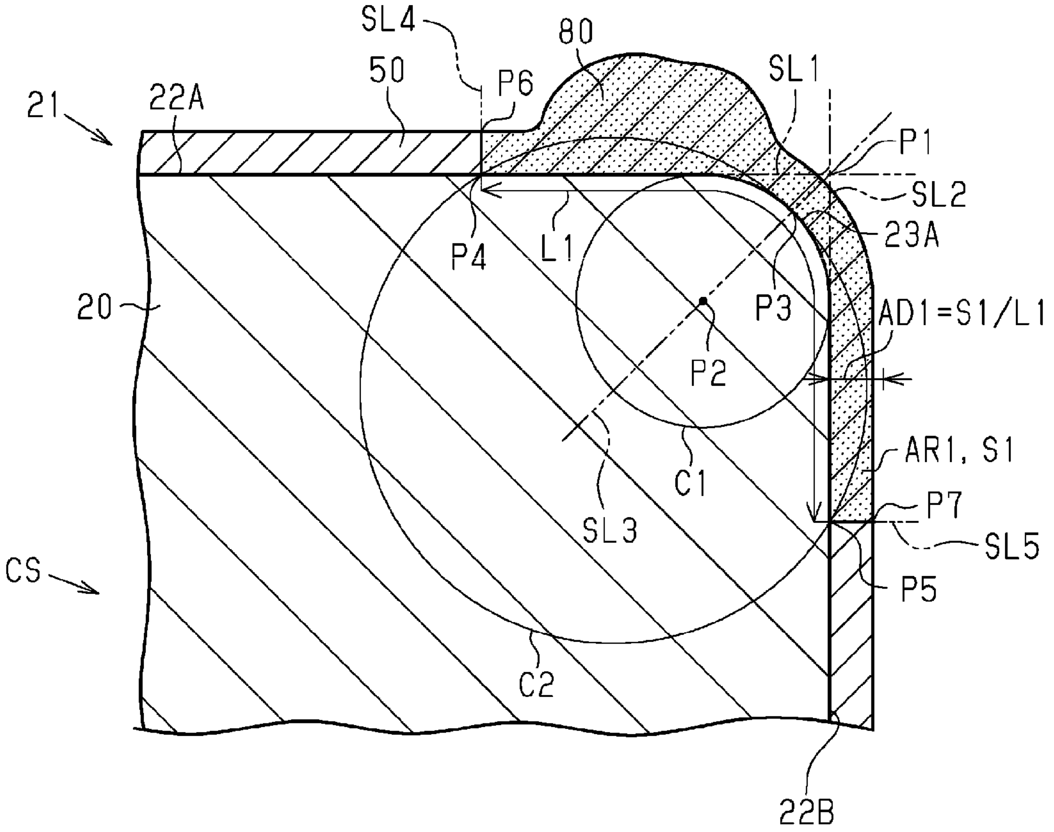
FIG. 7 is an enlarged sectional view of the electronic component.

As illustrated in FIG. 5, first, a cross section CS including the center of the base body 20 in the direction along the first axis X and orthogonal to the first axis X is photographed with an electron microscope. Then, as illustrated in FIG. 7, in calculating the first average dimension AD1, first, a first length L1, which is the length of the first boundary surface 23A, is measured in the section CS.

In the measurement of the first length L1, first, a first circle C1 including the curved portion of the first boundary surface 23A is drawn in the section CS. In this case, a portion of the first circle C1 coincides with the curved portion of the first boundary surface 23A. Next, in the section CS, a first intersection P1 at which a straight line SL1 extending along the first surface 22A and a straight line SL2 extending along the second surface 22B intersect is defined. Next, a straight line SL3 connecting a center point P2 of the first circle C1 and the first intersection P1 is drawn. Next, a second intersection P3 at which the straight line SL3 and the first circle C1 intersect is defined.

Next, a second circle C2 with which the first circle C1 is in internal contact is drawn. The second circle C2 is drawn such that the first circle C1 is in contact therewith at the second intersection P3. At this time, the center of the second circle C2 is on the straight line SL3. In addition, a diameter of the second circle C2 is twice a diameter of the first circle C1.

Next, a third intersection P4 at which the second circle C2 and the first surface 22A intersect is defined. In addition, a fourth intersection P5 at which the second circle C2 and the second surface 22B intersect is defined. In the section CS, a length of a portion extending along the outer surface 21 of the base body 20 from the third intersection P4 to the fourth intersection P5 is taken as the first length L1 which is the length of the first boundary surface 23A.

Next, in the section CS, a fifth intersection P6 at which a straight line SL4 extending from the third intersection P4 in the third positive direction Z1 and the surface of the insulating film 50 intersect is defined. In addition, a sixth intersection P7 at which a straight line SL5 extending from the fourth intersection P5 in the second positive direction Y1 and the surface of the insulating film 50 intersect is defined.

Next, in the section CS, a sectional area S1 of a first range AR1 defined by a line from the third intersection P4 to the fourth intersection P5 along the outer surface 21, the straight line SL4, the straight line SL5, and a line from the fifth intersection P6 to the sixth intersection P7 along the surface of the insulating film 50 is calculated by image processing. The first average dimension AD1 is calculated by dividing the sectional area S1 by the first length L1.

(Film Thickness of Insulating Film on Plane)

A method of calculating a second average dimension AD2 will be described. The second average dimension AD2 is the thickness of the insulating film 50 covering the first surface 22A. That is, the second average dimension AD2 is an average value of a distance from the first surface 22A to the surface of the insulating film 50 covering the first surface 22A in a direction orthogonal to the first surface 22A. The second average dimension AD2 is measured in the section CS similarly to the first average dimension AD1.

As illustrated in FIG. 6, first, a center point P8, which is the center of the first surface 22A in the direction along the second axis Y, is defined in the section CS. Next, a point located to be shifted from the center point P8 along the outer surface 21 of the base body 20 by a half of the first length L1 in the second positive direction Y1 is defined as a start point P9. A point located to be shifted from the center point P8 along the outer surface 21 of the base body 20 by a half of the first length L1 in the second negative direction Y2 is defined as an end point P10.

Next, in the section CS, a seventh intersection P11 at which a straight line SL6 passing through the start point P9 and extending in the third positive direction Z1 and the surface of the insulating film 50 intersect is defined. In addition, an eighth intersection P12 at which a straight line SL7 extending from the end point P10 in the third positive direction Z1 and the surface of the insulating film 50 intersect is defined.

Next, in the section CS, a sectional area S2 of a second range AR2 defined by a line from the start point P9 to the end point P10 along the outer surface 21, the straight line SL6, the straight line SL7, and a line from the seventh intersection P11 to the eighth intersection P12 along the surface of the insulating film 50 is calculated by image processing. The second average dimension AD2 is calculated by dividing the sectional area S2 by the first length L1.

Then, the first average dimension AD1 and the second average dimension AD2 described above are measured at a total of three points in another section parallel to the section CS. Then, an average thickness of the insulating film 50 covering the first surface 22A is calculated as an average value of the three first average dimensions AD1. In addition, the average thickness of the insulating film 50 covering the first boundary surface 23A is calculated as an average value of the three second average dimensions AD2. In this case, the average thickness of the insulating film 50 covering the first boundary surface 23A is larger than the average thickness of the insulating film 50 covering the first surface 22A.

(Thick Film Portion on Boundary Surface)

Figure 8:
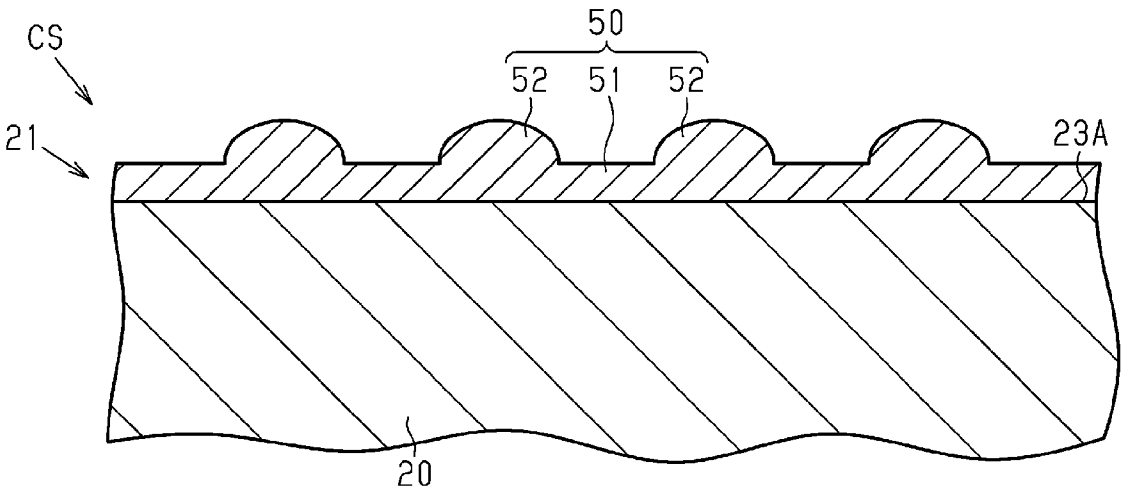
FIG. 8 is an enlarged sectional view of the electronic component.

Meanwhile, a large number of the thick film portions 52 exist on the first boundary surface 23A as compared with the first surface 22A. Thus, as illustrated in FIG. 8, in a section orthogonal to the first boundary surface 23A and parallel to the first axis X, the plurality of thick film portions 52 exist on the first boundary surface 23A. In the section, the plurality of thick film portions 52 are arranged along the first axis X. Thus, in such a section orthogonal to the first boundary surface 23A and parallel to the first axis X, there is a high probability that the thick film portion 52 is included in the first boundary surface 23A. Thus, as described above, the average thickness of the insulating film 50 covering the first boundary surface 23A is larger than the average thickness of the insulating film 50 covering the first surface 22A.

For the second surface 22B to the fourth surface 22D, the average dimension calculated in the same manner as the second average dimension AD2 is substantially the same as the second average dimension AD2. In addition, for the second boundary surface 23B to the fourth boundary surface 23D, the average dimension calculated in the same manner as the first average dimension AD1 is substantially the same as the first average dimension AD1. Thus, an average value of the average dimensions of the second boundary surface 23B to the fourth boundary surface 23D in the different section CS is larger than an average value of the average dimensions of the second surface 22B to the fourth surface 22D, similarly to the first average dimension AD1.

In addition, for the fifth surface 22E to the sixth surface 22F, the average dimension calculated in the same manner as the second average dimension AD2 is substantially the same as the second average dimension AD2. In addition, for the fifth boundary surface 23E to the twelfth boundary surface 23L, the average dimension calculated in the same manner as the first average dimension AD1 is substantially the same as the first average dimension AD1.

Here, as described above, the first corner surface 24A is the surface of the position where the first boundary surface 23A, the fifth boundary surface 23E, and the sixth boundary surface 23F intersect. An average dimension of the insulating film 50 on each of the first boundary surface 23A, the fifth boundary surface 23E, and the sixth boundary surface 23F is larger than the second average dimension AD2. Accordingly, the thickness of the insulating film 50 covering the first corner surface 24A is larger than second average dimension AD2. Furthermore, the thickness of the insulating film 50 covering the first corner surface 24A is larger than first average dimension AD1. For the second corner surface 24B to the eighth corner surface 24H, an average value of a thickness dimension from each corner surface to the surface of the insulating film 50 is larger than the second average dimension AD2 and larger than the first average dimension AD1.

One Embodiment of Method of Manufacturing Electronic Component (Overall Configuration)

Next, a method of manufacturing the electronic component 10 will be described.

Figure 9:
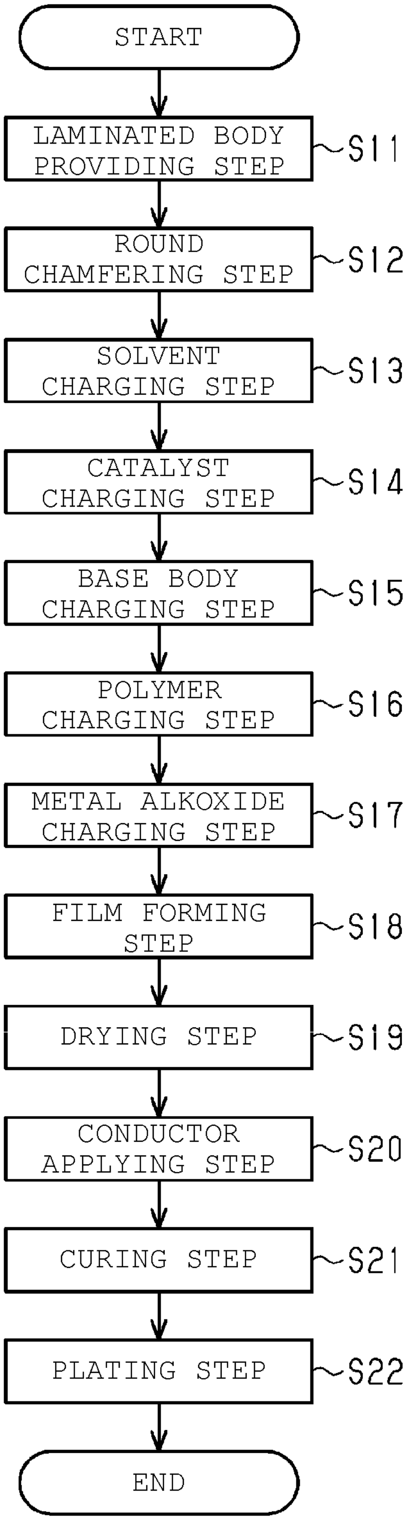
FIG. 9 is an explanatory diagram illustrating a method of manufacturing the electronic component.

As illustrated in FIG. 9, the method of manufacturing the electronic component 10 includes a laminated body providing step S11, a round chamfering step S12, a solvent charging step S13, a catalyst charging step S14, a base body charging step S15, a polymer charging step S16, and a metal alkoxide charging step S17. The method of manufacturing the electronic component 10 further includes a film forming step S18, a drying step S19, a conductor applying step S20, a curing step S21, and a plating step S22.

First, when the base body 20 is formed, in the laminated body providing step S11, a laminated body that is the base body 20 not including the boundary surface 23 and the corner surface 24 is provided. That is, the laminated body is in a state before round chamfering, and has a rectangular parallelepiped shape having the six surfaces 22. For example, first, a plurality of ceramic sheets to be the base body 20 are provided. The sheet has a thin plate shape. A conductive paste to be the first internal electrode 41 is stacked on the sheet. A ceramic sheet to be the base body 20 is stacked on the laminated paste. A conductive paste to be the second internal electrode 42 is stacked on the sheet. In this manner, the ceramic sheet and the conductive paste are stacked. Then, an unfired laminated body is formed by cutting into a predetermined size. Thereafter, the unfired laminated body is fired at a high temperature to provide a laminate.

Next, the round chamfering step S12 is performed. In the round chamfering step S12, the boundary surface 23 and the corner surface 24 are formed on the laminated body provided in the laminated body providing step S11. For example, a corner of the laminated body is round-chamfered by barrel polishing, whereby the boundary surface 23 having a curved surface and the corner surface 24 having a curved surface are formed. Thus, the base body 20 is formed.

Figure 10:
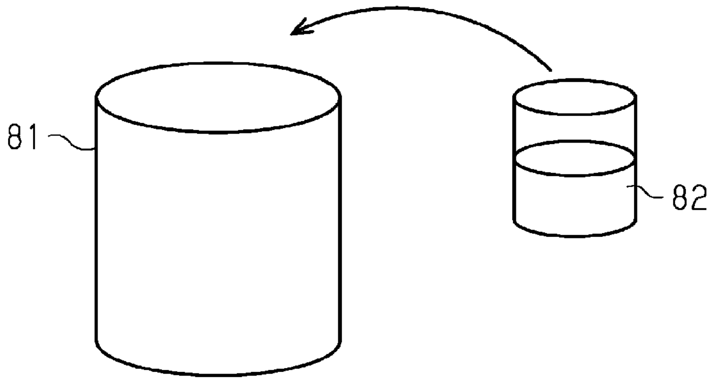
FIG. 10 is an explanatory diagram illustrating the method of manufacturing the electronic component.

Next, the solvent charging step S13 is performed. As illustrated in FIG. 10, in the solvent charging step S13, 2-propanol is charged as a solvent 82 into a reaction vessel 81.

Figure 11:
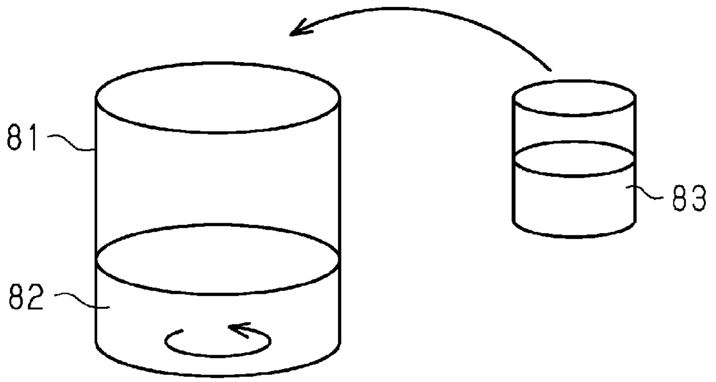
FIG. 11 is an explanatory diagram illustrating the method of manufacturing the electronic component.

Next, as illustrated in FIG. 9, the catalyst charging step S14 is performed. As illustrated in FIG. 11, in the catalyst charging step S14, first, stirring of the solvent 82 in the reaction vessel 81 is started. Then, ammonia water as an aqueous solution 83 containing a catalyst is charged into the reaction vessel 81. The catalyst in this embodiment is a hydroxide ion, and functions as a catalyst that promotes hydrolysis of a metal alkoxide 85 described later.

Figure 12:
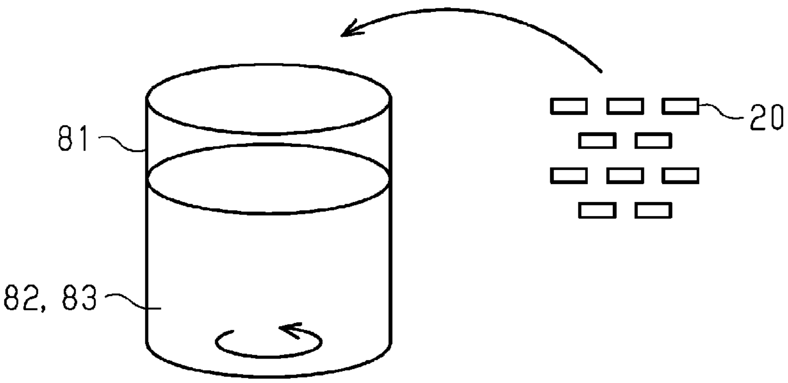
FIG. 12 is an explanatory diagram illustrating the method of manufacturing the electronic component.

Next, as illustrated in FIG. 9, the base body charging step S15 is performed. As illustrated in FIG. 12, in the base body charging step S15, the plurality of base bodies 20 formed in advance in the round chamfering step S12 as described above are charged into the reaction vessel 81.

Figure 13:
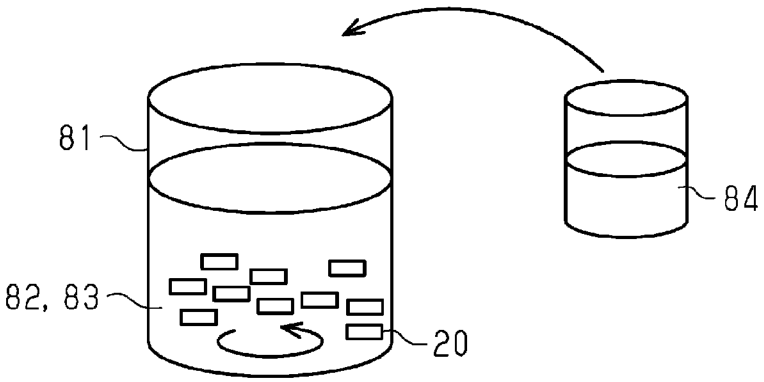
FIG. 13 is an explanatory diagram illustrating the method of manufacturing the electronic component.

Next, as illustrated in FIG. 9, the polymer charging step S16 is performed. As illustrated in FIG. 13, in the polymer charging step S16, polyvinylpyrrolidone is charged as a polymer 84 into the reaction vessel 81. As a result, the polymer 84 charged into the reaction vessel 81 is adsorbed to the outer surface 21 of the base body 20. A molecular weight of polyvinylpyrrolidone in the present embodiment is 45,000.

Figure 14:
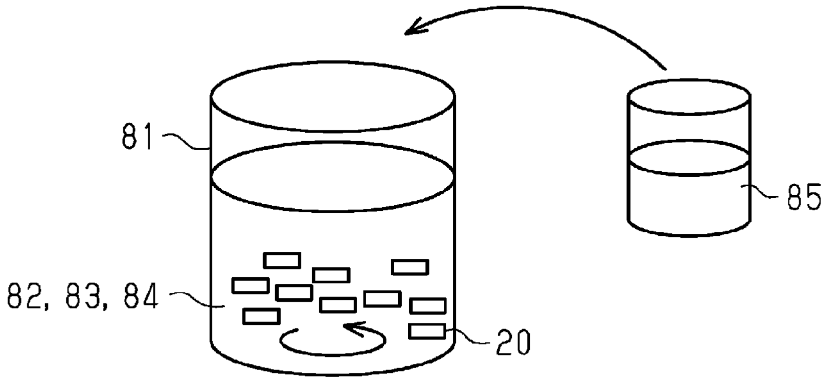
FIG. 14 is an explanatory diagram illustrating the method of manufacturing the electronic component.

Next, as illustrated in FIG. 9, the metal alkoxide charging step S17 is performed. As illustrated in FIG. 14, in the metal alkoxide charging step S17, tetraethyl orthosilicate in a liquid state is charged as the metal alkoxide 85 into the reaction vessel 81. Tetraethyl orthosilicate is sometimes referred to as tetraethoxysilane. In the present embodiment, an amount of the metal alkoxide 85 to be charged in the metal alkoxide charging step S17 is calculated based on an area of the outer surface 21 of the base body 20 charged in the base body charging step S15. Specifically, the calculation is performed by multiplying the amount of the metal alkoxide 85 per one base body 20 necessary for forming the insulating film 50 covering the outer surface 21 of the base body 20 by the number of base bodies 20.

Next, as illustrated in FIG. 9, the film forming step S18 is performed. In the film forming step S18, the stirring of the solvent 82 started in the solvent charging step S13 described above is continued for a predetermined time after the metal alkoxide 85 is charged into the reaction vessel 81 in the metal alkoxide charging step S17. The stirring time in the film forming step S18 in the present embodiment is 90 minutes.

In the film forming step S18, the insulating film 50 is formed by a liquid phase reaction in the reaction vessel 81. In this liquid phase reaction, the metal alkoxide 85 and the like contained in the solvent 82 form the insulating film by the liquid phase reaction.

Next, the drying step S19 is performed. In the drying step S19, after stirring is continued for a predetermined time in the film forming step S18, the base body is taken out from the reaction vessel 81 and dried. As a result, the sol-like insulating film 50 is dried to become the gel-like insulating film 50. In the present embodiment, a film forming method for forming the insulating film 50 on the base body 20 is configured by the solvent charging step S13, the catalyst charging step S14, the base body charging step S15, the polymer charging step S16, the metal alkoxide charging step S17, and the film forming step S18.

Next, the conductor applying step S20 is performed. In the conductor applying step S20, a conductor paste is applied to two portions of the surface of the insulating film that is, a portion including a portion covering the fifth surface 22E of the base body 20 and a portion including a portion covering the sixth surface 22F of the base body 20. Specifically, the conductor paste is applied so as to cover the insulating film 50 between the entire region of the fifth surface 22E and a portion of the first surface 22A to the fourth surface 22D. Furthermore, the conductor paste is applied so as to cover the insulating film 50 between the entire region of the sixth surface 22F and a portion of the first surface 22A to the fourth surface 22D.

Next, the curing step S21 is performed. Specifically, in the curing step S21, the base body 20 applied with the insulating film 50 and the conductor paste is heated. As a result, water and the polymer 84 are vaporized from the gel-like insulating film 50, so that the insulating film 50 covering the outer surface 21 of the base body 20 is fired and cured as illustrated in FIG. 3. At the same time, the conductor paste applied in the conductor applying step S20 is fired to form the first underlying electrode 61A and the second underlying electrode 62A. Thus, the conductor applying step S20 and the curing step S21 constitute an underlying electrode forming step. That is, in the present embodiment, the curing step S21 serves not only as a step of curing the insulating film 50 but also as a partial step of the underlying electrode forming step.

In the present embodiment, at the time of heating in the curing step S21, palladium contained on the first internal electrode 41 side is attracted toward the first underlying electrode 61A containing silver due to the Kirkendall effect caused by a difference in diffusion rate between the first internal electrode 41 and the first underlying electrode 61A. As a result, the first penetrating portion 71 penetrates and extends through the insulating film 50 from the first internal electrode 41 toward the first underlying electrode 61A, so that the first internal electrode 41 and the first underlying electrode 61A are connected. In this respect, the same applies to the second penetrating portion 72 connecting the second internal electrode 42 and the second underlying electrode 62A.

Next, the plating step S22 is performed. Electroplating is performed on portions of the first underlying electrode 61A and the second underlying electrode 62A. As a result, the first metal layer 61B is formed on a surface of the first underlying electrode 61A. In addition, the second metal layer 62B is formed on a surface of the second underlying electrode 62A. Although not illustrated, the first metal layer 61B and the second metal layer 62B are electroplated with two kinds of nickel and tin to form a two-layer structure. In this way, the electronic component 10 is formed.

(Consideration of Film Forming Process)

The inventors have found that the film main body 51 and the thick film portion 52 in the insulating film 50 are formed in the film forming step S18 described above. Thus, the formation of the film main body 51 and the thick film portion 52 in the film forming process has been considered along the time series. Hereinafter, the sol-like insulating film 50 will be described as a glass layer 85C.

Figure 15:
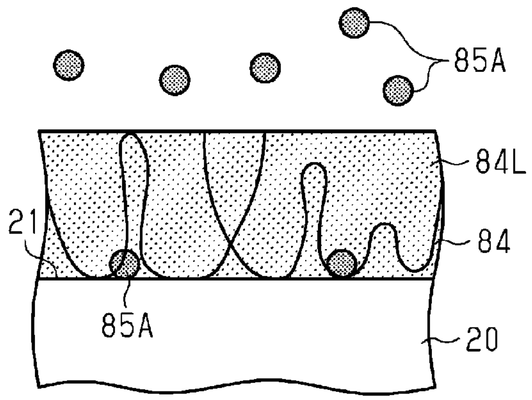
FIG. 15 is an explanatory diagram illustrating a film forming process of the electronic component.

As illustrated in FIG. 15, when the polymer 84 is charged into the reaction vessel 81 in the polymer charging step S16, the polymer 84 is adsorbed to the outer surface 21 of the base body 20. As a result, a polymer layer 84L made of the polymer 84 is formed on the outer surface 21 of the base body 20. Since the polymer 84 is net-like, most of the polymer layer 84L is void. The metal alkoxide 85 charged in the metal alkoxide charging step S17 is hydrolyzed by hydroxide ions as a catalyst. When the metal alkoxide 85 is hydrolyzed, the hydrolyzed metal alkoxides 85 are dehydration-condensed to form glass core particles 85A. Some of the formed glass core particles 85A pass through steric hindrance of the polymer 84 in the polymer layer 84L and are adsorbed to the outer surface 21 of the base body 20.

Figure 16:
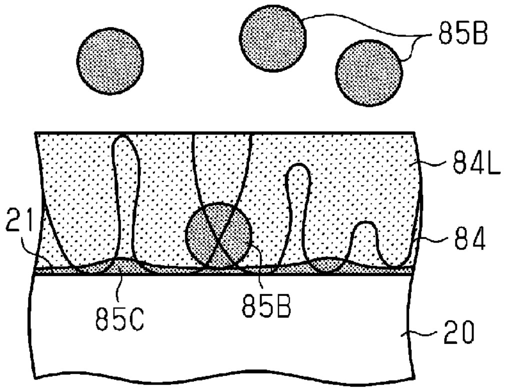
FIG. 16 is an explanatory diagram illustrating the film forming process of the electronic component.

As illustrated in FIG. 16, the glass core particles 85A adsorbed to the outer surface 21 of the base body 20 are repeatedly hydrolyzed and dehydration-condensed to form the layered glass layer 85C covering the outer surface 21. On the glass layer 85C, the hydrolyzed metal alkoxides 85 are dehydration-condensed to grow the glass layer 85C.

On the other hand, the hydrolyzed metal alkoxide 85 adheres to a surface of the glass core particle 85A in the solvent 82. Then, the dehydration condensation of the hydrolyzed metal alkoxide 85 proceeds on the surface of the glass core particle 85A, and the glass core particle 85A grows. As a result, the glass core particles 85A of the solvent 82 become glass nanoparticles 85B having a large size. Some of the glass nanoparticles 85B are adsorbed to the glass layer 85C.

Figure 17:
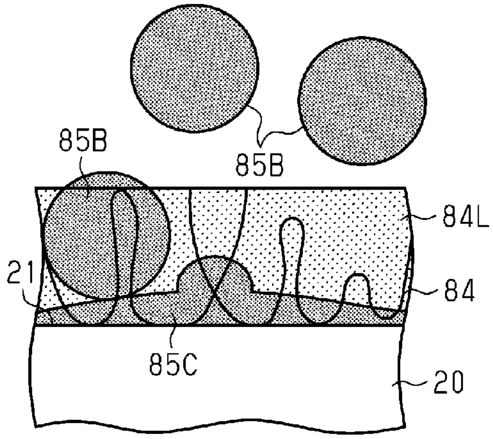
FIG. 17 is an explanatory diagram illustrating the film forming process of the electronic component.

As illustrated in FIG. 17, the glass nanoparticles adsorbed to the glass layer 85C are integrated with the glass layer 85C by repeating hydrolysis and dehydration condensation. At this time, the glass nanoparticles 85B are deposited on the surface of the glass layer 85C and spread so as to be melted on the surface of the glass layer 85C. Thus, the glass layer 85C grows so that the thickness becomes gradually uniform. On the glass layer 85C, the hydrolyzed metal alkoxides 85 are dehydration-condensed to further grow the glass layer 85C.

On the other hand, the glass nanoparticles 85B in the solvent 82 further gradually increase in size as in the case where the glass core particles 85A grow into the glass nanoparticles 85B. Some of the larger glass nanoparticles 85B are adsorbed to the glass layer 85C.

Figure 18:
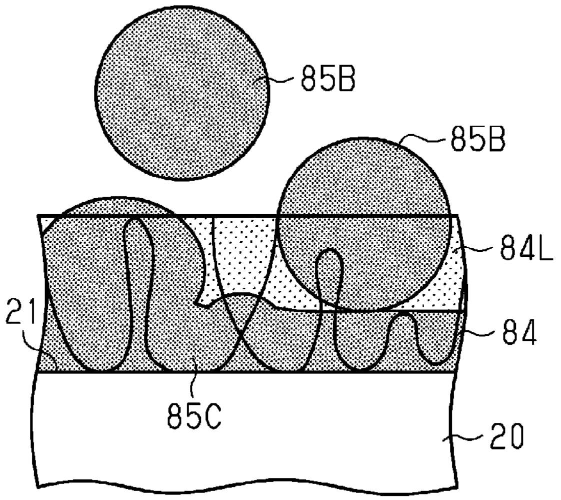
FIG. 18 is an explanatory diagram illustrating the film forming process of the electronic component.

As illustrated in FIG. 18, the glass nanoparticles adsorbed to the glass layer 85C are integrated with the glass layer 85C as in the case described above. Some of the glass nanoparticles 85B in the solvent 82 are adsorbed to the glass layer 85C.

Figure 19:
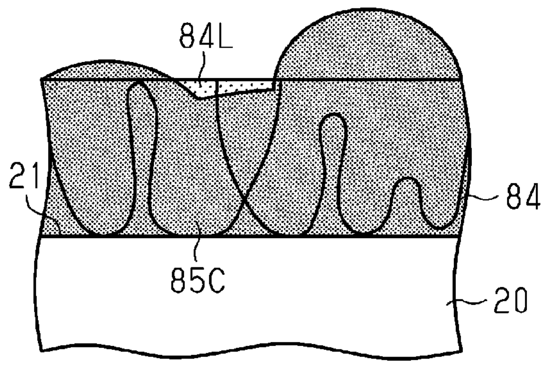
FIG. 19 is an explanatory diagram illustrating the film forming process of the electronic component.

As illustrated in FIG. 19, the growth of the glass layer 85C and the integration of the glass nanoparticles 85B on the glass layer 85C into the glass layer 85C further proceed. When the glass nanoparticles 85B in the solvent 82 are not incorporated into the polymer layer 84L, the growth of the film thickness of the glass layer 85C stops.

Thereafter, in curing step S21, the glass layer 85C becomes the insulating film 50, and the polymer 84 is burned. Thus, the insulating film 50 of the manufactured electronic component 10 substantially does not contain the polymer 84. In the glass layer 85C, some of the glass nanoparticles 85B protrude outward more than the other portion to be the film main body 51, thereby forming the thick film portion 52 of the insulating film 50.

As described above, in the glass layer 85C, since the glass nanoparticles 85B are integrally grown so as to be a portion of the glass layer 85C, there is no boundary between the film main body 51 and the thick film portion 52 in the insulating film 50.

Among some of the glass nanoparticles 85B, a portion that is not thoroughly formed in a layer shape is formed as a portion of the thick film portion 52. Thus, the thick film portion 52 is formed to protrude outward from the film main body 51.

In addition, the glass layer 85C grows so as to have a uniform thickness in a layered manner. Thus, the thickness of the glass layer 85C becomes substantially uniform except for a portion derived from the glass nanoparticles 85B attached in the last stage of the film forming step S18.

(Results of Comparative Test)

Here, the electronic component 10 manufactured by the above-described manufacturing method is referred to as Example 1. In the electronic component 10 of Example 2, the molecular weight of polyvinylpyrrolidone used as the polymer 84 is 1.2 million as compared with that in Example 1. Other conditions are the same as those in Example 1.

As compared with Example 1, the electronic component 10 of Example 3 was manufactured without using the polymer 84 and without the polymer charging step S16. In the electronic component of Example 4, the molecular weight of polyvinylpyrrolidone used as the polymer 84 is 2.8 million as compared with that in Example 1.

The electronic component 10 of Example 5 was manufactured by repeating the film forming method in Example 2 four times. The electronic component 10 of Example 6 was manufactured by repeating the film forming method in Example 4 five times. The electronic component 10 of Example 7 was manufactured by repeating the film forming method in Example 4 ten times.

The electronic component of Comparative Example was manufactured by mixing nanoparticles composed of at least one of titanium oxide and zirconium oxide having an average particle size of 450 nm as compared with Example 1. The electronic components 10 of Examples 1 to 7 and the electronic component of Comparative Example were manufactured using the same amount of the metal alkoxide 85.

The average thickness of the film main body 51 of the insulating film 50 was measured for the electronic components 10 of Examples 1 to 7 and the electronic component of Comparative Example. The average thickness of the film main body 51 was measured in the section CS passing through the center of the base body 20 in the direction along the first axis X. The maximum thickness TM of the thick film portion 52 and the maximum width WM of the thick film portion 52 were measured for the electronic components 10 of Examples 1 to 7 and the electronic component of Comparative Example.

In addition, the maximum width WM with respect to the maximum thickness TM was calculated from the measured maximum thickness TM of the thick film portion 52 and the maximum width WM of the thick film portion 52. The average thickness of the film main body 51 with respect to the maximum thickness TM of the thick film portion 52 was calculated from the measured average thickness of the film main body 51 and the maximum thickness TM of the thick film portion 52.

Figures 20, 21:
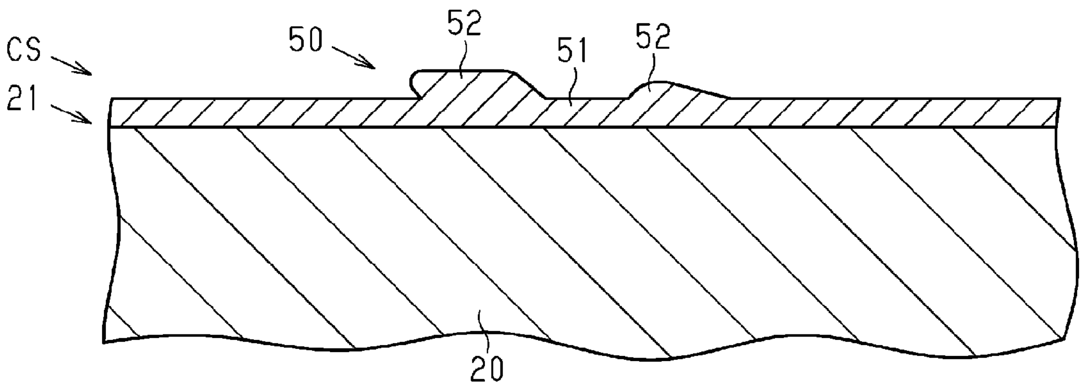
FIG. 20 is a table showing comparison results of the electronic components between Examples and Comparative Examples.
FIG. 21 is an enlarged sectional view of the electronic component according to a modification.

Then, the electronic components 10 of Examples 1 to 7 and the electronic component of Comparative Example were evaluated by microscratch and a chip and crack test. The microscratch scans a diamond needle having a tip radius of curvature of 25 μm with a load of 100 mN by 400 μm. If there was no scratch, it was determined as pass, and if there was a scratch, it was determined as fail. In the chip and crack test, 1,000 electronic components are swung with a predetermined load. When 10 or more chips and cracks were generated, it was determined as fail, and when less than 10 chips and cracks were generated, it was determined as pass. In FIG. 20, ○ indicates pass, and x indicates fail.

As illustrated in FIG. 20, the electronic components of Examples 1 to 7 passed both the microscratch test and the chip and crack test. On the other hand, the electronic component of Comparative Example failed in both the microscratch test and the chip and crack test.

Operation of Embodiment (1) In the above embodiment, the thickness of the insulating film 50 at the position where the thick film portion 52 exists is larger than the average thickness of the film main body 51. Since the thick film portion 52 and the film main body 51 are made of the same material, the thick film portion 52 and the film main body 51 are integrated and do not have a clear boundary. Thus, since the thick film portion 52 is firmly connected to the film main body 51, it is possible to suppress falling off of the thick film portion 52 from the film main body 51.

(2) In the above embodiment, the first underlying electrode 61A of the first external electrode 61 covers the surface of the insulating film 50. Since the thickness of the insulating film 50 at the position where the thick film portion 52 exists is larger than the average thickness of the film main body 51, it is easy to obtain a large contact area with the first underlying electrode 61A by the amount of the thick film portion 52 protruding outward more than the film main body 51 as compared with the case where the thick film portion 52 does not exist. As a result, the first underlying electrode 61A can be more firmly adhered to the insulating film 50.

(3) In the above embodiment, the average thickness of the film main body 51 is 30 nm or more. Thus, if an impact is applied from the outside of the electronic component 10, the electronic component has a considerable thickness, and thus can easily withstand the impact. In the above embodiment, the average thickness of the film main body 51 is 1,000 nm or less. If ceramic particles are distributed in the insulating film 50 in the state where the average thickness of the film main body 51 is considerably small as described above, the ceramic particles tend to largely protrude from the insulating film 50. Thus, the ceramic particles are easily detached from the insulating film 50. Therefore, the average thickness is suitable for applying the configuration in which the thick film portion 52 and the film main body 51 are integrated.

(4) In the above embodiment, the average thickness of the film main body 51 is 0.15 times or more the average value of the maximum thickness TM of the thick film portion 52. Thus, the film main body 51 is considerably smaller than the thick film portion 52. Thus, the thick film portion 52 largely protrudes from the film main body 51. However, since the thick film portion 52 is integrated with the film main body 51, the thick film portion 52 is hardly detached from the film main body 51.

The average thickness of the film main body 51 is times or less the average value of the maximum thickness TM of the thick film portion 52. Thus, the thick film portion 52 does not excessively protrude from the film main body 51. Thus, since the thick film portion 52 excessively protrudes from the film main body 51, it is possible to suppress occurrence of breakage such as chipping or cracking in the thick film portion 52 when an impact is applied to the thick film portion 52 from the outside.

(5) In the above embodiment, the maximum width WM of the thick film portion 52 is 0.7 times or more the maximum thickness TM of the thick film portion 52. Thus, a contact area of the thick film portion 52 in contact with the base body 20 is considerably large. Thus, the thick film portion 52 is hardly detached from the base body 20.

The maximum width WM of the thick film portion 52 is 4.0 times or less the maximum thickness TM of the thick film portion 52. Thus, the thick film portion 52 considerably extends toward the outside. Thus, a portion of the insulating film 50 that is not covered with the first external electrode 61 and the second external electrode 62 is susceptible to external impact. However, since the thick film portion 52 is integrated with the film main body 51, the thick film portion 52 is hardly detached from the film main body 51. Since a contact area between the first external electrode 61 and the second external electrode 62 can be increased at a portion of the insulating film 50 covered with the first external electrode 61 and the second external electrode 62, the insulating film 50 can be firmly adhered to the first external electrode 61 and the second external electrode 62.

(6) In the above embodiment, the portion of the insulating film 50 covering the first boundary surface 23A is more likely to collide with another object such as a jig or another electronic component than the portion of the insulating film 50 covering the first surface 22A. According to the above embodiment, the average thickness of the insulating film 50 covering the first boundary surface 23A of the surface of the insulating film 50 is larger than the average thickness of the insulating film 50 covering the first surface 22A. Thus, the effect of protecting the first boundary surface 23A by the insulating film 50 is greater than the effect of protecting the first surface 22A. Therefore, if the portion of the outer surface 21 of the insulating film 50 covering the first boundary surface 23A collides with another object, the impact hardly reaches the base body 20. As a result, damage on the first boundary surface 23A of the base body 20 can be suppressed.

OTHER EMBODIMENTS

The above embodiment can be modified as below and be implemented. The above embodiment and the following modifications can be implemented in combination within a range not technically contradictory.

In the above embodiment, the electronic component 10 is not limited to the negative characteristic thermistor component. For example, the electronic component may be a thermistor component other than a negative characteristic, a multilayer capacitor component, or an inductor component.

The shape of the base body 20 is not limited to the example of the above embodiment. For example, the base body 20 may have a polygonal columnar shape other than the quadrangular columnar shape having the central axis CA. Furthermore, the base body 20 may be a core of a wire-wound inductor component. For example, the core may have a so-called drum core shape. Specifically, the core may have a columnar winding core portion and a flange portion provided at each end of the winding core portion. In this case, the boundary surface 23 is a surface at a portion where an angle on the base body 20 side among angles formed by the adjacent surfaces 22 is less than 180 degrees.

The outer surface 21 of the base body 20 may not have the corner surface 24 including the curved surface. For example, when a boundary between the adjacent surfaces 22 of the outer surface 21 of the base body 20 does not have a chamfered shape, there is no curved surface at the boundary. Thus, the corner surface 24 including a curved surface may not exist at a portion where three such boundaries intersect.

The outer surface 21 of the base body 20 may not have the first boundary surface 23A including the curved surface. For example, the base body 20 may be a laminated body in a state where the round chamfering step S12 is not performed. In this case, the outer surface 21 includes the first surface 22A to the sixth surface 22F.

The range of the first boundary surface 23A in the above embodiment is merely an example. The first boundary surface 23A may have any range as long as it is defined as a region including all the curved portions in a boundary portion between the first surface 22A and the second surface 22B. That is, in the example illustrated in FIG. 7, the first length L1 only needs to be a length including the curved portion of the boundary between the first surface 22A and the second surface 22B. In the example illustrated in FIG. 7, when the diameter of the second circle C2 is the same as the diameter of the first circle C1, the first length L1 is a length including only the curved portion of the boundary between the first surface 22A and the second surface 22B. In the above embodiment, the diameter of the second circle C2 can be appropriately changed as long as it is once or more times the diameter of the first circle C1. However, it is necessary to determine the diameter of the second circle C2 so that the first range AR1 and the second range AR2 do not overlap. In this respect, the same applies to the other boundary surfaces 23. The first average dimension AD1 tends to be larger than the second average dimension AD2 as the first length L1 is smaller, that is, as the number of planar portions of the boundary surface 23 is smaller.

In the above embodiment, the shapes of the first internal electrode 41 and the second internal electrode 42 are not limited as long as they can ensure electrical conduction with the corresponding first external electrode 61 and second external electrode 62. The number of the first internal electrodes 41 and the number of the second internal electrodes 42 are not limited, and the number of the first internal electrodes 41 may be one or three or more.

The configuration of the first external electrode 61 is not limited to the example of the above embodiment. For example, the first external electrode 61 may include only the first underlying electrode 61A, or the first metal layer 61B may not have the two-layer structure. When the first external electrode 61 includes the first metal layer 61B, the insulating film 50 covers the entire outer surface 21 of the base body 20, so that an effect of suppressing dissolution of the base body 20 in a plating solution can be obtained. In this respect, the same applies to the second external electrode 62.

In the above embodiment, the material combination of the first internal electrode 41 and the first underlying electrode 61A is not limited to the combination of palladium and silver. For example, a combination of copper and nickel, copper and silver, silver and gold, nickel and cobalt, or nickel and gold may be used. For example, one may be silver, and the other may be a combination of silver and palladium. For example, one may be palladium and the other may be a combination of silver and palladium, or one may be copper and the other may be a combination of silver and palladium. For example, one may be gold, and the other may be a combination of silver and palladium.

Depending on the combination of the first internal electrode 41 and the first underlying electrode 61A, the Kirkendall effect may not be obtained. In this case, before an external electrode forming step, for example, the fifth surface 22E side of the base body 20 only needs to be polished to physically remove a portion of the insulating film 50 so that the first internal electrode 41 is exposed. Thereafter, the first internal electrode 41 and the first underlying electrode 61A can be connected by performing the underlying electrode forming step. For example, after the first underlying electrode 61A is formed, the insulating film 50 may be formed including the surface of the first underlying electrode 61A, and the insulating film 50 covering the surface of the first underlying electrode 61A may be removed. In this respect, the same applies to the material combination of the second internal electrode 42 and the second underlying electrode 62A.

The arrangement place of the first external electrode 61 is not limited to the example of the above embodiment. For example, the first external electrode 61 may be disposed only on the fifth surface 22E and one of the first surface 22A to the fourth surface 22D. In this respect, the same applies to the second external electrode 62.

The insulating film 50 may not cover the entire region of the outer surface 21 of the base body 20. That is, a portion of the outer surface 21 of the base body 20 may be exposed from the insulating film 50. The range covered by the insulating film 50 may be appropriately changed in accordance with the shape of the base body 20, the positions of the first external electrode 61 and the second external electrode 62, and the like.

In the portion of the insulating film 50 covered with the first underlying electrode 61A, glass in the insulating film 50 may be diffused into glass in the first underlying electrode 61A to be integrated with each other.

The average thickness of the film main body 51 is not limited to the example of the above embodiment. The average thickness of the film main body 51 may be less than 30 nm or more than 1,000 nm.

The average thickness of the film main body 51 may be less than 0.15 times the average value of the maximum thickness TM of the thick film portion 52, or may be more than 0.91 times the average value of the maximum thickness TM of the thick film portion 52. When the average thickness of the film main body 51 is 0.22 times to 0.90 times of the average value of the maximum thickness TM of the thick film portion 52, the evaluation results of the microscratch test and the chip and crack test are pass. Thus, it is more preferable that the average thickness of the film main body 51 is within this range.

In the section CS, the maximum width WM of the thick film portion 52 may be less than 0.7 times the maximum thickness TM of the thick film portion 52, or may be more than 4.0 times the maximum thickness TM of the thick film portion 52.

The method of calculating the first average dimension AD1 in the above embodiment is an example and can be changed. For example, in the section CS, a plurality of points are randomly specified on the boundary surface 23. A tangent line is drawn at each specified point, and an orthogonal line orthogonal to the tangent line is drawn. An average value in a thickness direction from the boundary surface 23 to the surface of the insulating film 50 on the orthogonal line may be set as the first average dimension AD1. Similarly, the method of calculating the second average dimension AD2 can be changed.

The average thickness of the insulating film 50 covering the first boundary surface 23A may be equal to or less than the average thickness of the insulating film 50 covering the first surface 22A. For example, as a whole, since the number of thick film portions 52 is considerably large also on the first surface 22A, the average thickness of the insulating film 50 covering the first surface 22A may be larger than the average thickness of the insulating film 50 covering the first boundary surface 23A.

The shape of the thick film portion 52 is not limited to the example of the above embodiment. In the modification illustrated in FIG. 21, the thick film portion 52 has a flat shape as a whole in the section CS. The shape of the thick film portion 52 is determined in the process of repeating hydrolysis and dehydration condensation of the glass nanoparticles 85B in the film forming process described above. When the glass nanoparticles 85B adhere to and are integrated with the glass layer 85C and the film forming step S18 is immediately completed, the outer side of the thick film portion 52 tends to have an arc shape. On the other hand, when the film forming step S18 is completed after a lapse of a considerable time for repeating hydrolysis and dehydration condensation after the glass nanoparticles 85B adhere to the glass layer 85C, the thick film portion 52 may have a flat shape as a whole as in the modification illustrated in FIG. 21.

The material of the insulating film 50 is not limited to the example of the above embodiment. For example, the glass is not limited to silicon dioxide, and may be multicomponent oxide containing Si, such as a B—Si-based, Si—Zn-based, Zr—Si-based, or Al—Si-based oxide. Further, the glass may be a multicomponent oxide containing an alkali metal and Si, such as an Al—Si-based, Na—Si-based, K—Si-based, or Li—Si-based oxide. Furthermore, the glass may be a multicomponent oxide containing an alkaline earth metal and Si, such as an Mg—Si-based, Ca—Si-based, Ba—Si-based, or Sr—Si-based oxide. The glass may not contain Si, and may be a mixture thereof.

The material of the insulating film 50 may contain a surface treatment agent such as a pigment, a silicone-based flame retardant, a silane coupling agent, or a titanate coupling agent, or an antistatic agent in addition to glass. That is, the material of the film main body 51 and the material of the thick film portion 52 only need to include at least glass.

More specifically, the insulating film 50 may contain fine particles of an organic acid salt, an oxide, an inorganic salt, an organic salt, and other metal oxides and additives of nanoparticles in addition to glass.

Examples of the organic acid salt include salts of oxo acids such as soda ash, sodium carbonate, sodium hydrogen carbonate, sodium percarbonate, sodium sulfite, sodium hydrogen sulfite, sodium sulfate, sodium thiosulfate, sodium nitrate, and sodium sulfite, and halogen compounds such as sodium fluoride, sodium chloride, sodium bromide, and sodium iodide.

Examples of the oxide include sodium peroxide, and examples of the hydroxide include sodium hydroxide.

Examples of the inorganic salt include sodium hydride, sodium sulfide, sodium hydrogen sulfide, sodium silicate, trisodium phosphate, sodium borate, sodium borohydride, sodium cyanide, sodium cyanate, and sodium tetrachloroaurate.

Examples of the inorganic salt include calcium peroxide, calcium hydroxide, calcium fluoride, calcium chloride, calcium bromide, calcium iodide, calcium hydride, calcium carbide, and calcium phosphide.

The additive may be an oxoacid salt such as calcium carbonate, calcium hydrogen carbonate, calcium nitrate, calcium sulfate, calcium sulfite, calcium silicate, calcium phosphate, calcium pyrophosphate, calcium hypochlorite, calcium chlorate, calcium perchlorate, calcium bromate, calcium iodate, calcium arsenite, calcium chromate, calcium tungstate, calcium molybdate, calcium magnesium carbonate, or hydroxyapatite. Examples of the additive include calcium acetate, calcium gluconate, calcium citrate, calcium malate, calcium lactate, calcium benzoate, calcium stearate, and calcium aspartate.

For example, the additive may be lithium carbonate, lithium chloride, lithium titanate, lithium nitride, lithium peroxide, lithium citrate, lithium fluoride, lithium hexafluorophosphate, lithium acetate, lithium iodide, lithium hypochlorite, lithium tetraborate, lithium bromide, lithium nitrate, lithium hydroxide, lithium aluminum hydride, lithium triethylborohydride, lithium hydride, lithium amide, lithium imide, lithium diisopropylamide, lithium tetramethylpiperide, lithium sulfide, lithium sulfate, lithium thiophenolate, or lithium phenoxide.

For example, the additive may be boron triiodide, sodium cyanoborohydride, sodium borohydride, tetrafluoroboric acid, triethylborane, borax, or boric acid.

For example, the additive may be tripotassium arsenide, potassium bromide, potassium carbide, potassium chloride, potassium fluoride, potassium hydride, potassium iodide, potassium triiodide, potassium azide, potassium nitride, potassium superoxide, potassium ozonide, potassium peroxide, potassium phosphide, potassium sulfide, potassium selenide, potassium telluride, potassium tetrafluoroaluminate, potassium tetrafluoroborate, potassium tetrahydroborate, potassium methanide, potassium cyanide, potassium formate, potassium hydrogen fluoride, potassium tetraiodomercurate (II), potassium hydrogen sulfide, potassium octachlorodimolybdate (II), potassium amide, potassium hydroxide, potassium hexafluorophosphate, potassium carbonate, potassium tetrachloroplatinate (II), potassium hexachloroplatinate (IV), potassium nonahydridorhenate (VII), potassium sulfate, potassium acetate, gold(I) potassium cyanide, potassium hexanitritocobaltate (III), potassium hexacyanoferrate (III), potassium hexacyanoferrate (II), potassium methoxide, potassium ethoxide, potassium tert-butoxide, potassium cyanate, potassium fulminate, potassium thiocyanate, potassium aluminum sulfate, potassium aluminate, potassium arsenate, potassium bromate, potassium hypochlorite, potassium chlorite, potassium chlorate, potassium perchlorate, potassium carbonate, potassium chromate, potassium dichromate, potassium tetrakis(peroxo)chromate (V), potassium cuprate (III), potassium ferrate, potassium iodate, potassium periodate, potassium permanganate, potassium manganate, potassium hypomanganate, potassium molybdate, potassium nitrite, potassium nitrate, tripotassium phosphate, potassium perrhenate, potassium selenate, potassium silicate, potassium sulfite, potassium sulfate, potassium thiosulfate, potassium disulfite, potassium dithionate, potassium disulfate, potassium peroxodisulfate, potassium dihydrogenarsenate, dipotassium hydrogen arsenate, potassium hydrogen carbonate, potassium dihydrogen phosphate, dipotassium hydrogen phosphate, potassium hydrogen selenate, potassium hydrogen sulfite, potassium hydrogen sulfate, or potassium hydrogen peroxosulfate.

For example, the additive may be barium sulfite, barium chloride, barium chlorate, barium perchlorate, barium peroxide, barium chromate, barium acetate, barium cyanide, barium bromide, barium oxalate, barium nitrate, barium hydroxide, barium hydride, barium carbonate, barium iodide, barium sulfide, or barium sulfate. In addition, the additive may be sodium acetate or sodium citrate.

The additive may be fine particles or nanoparticles of a metal oxide, and examples of the metal oxide include sodium oxide, calcium oxide, lithium oxide, boron oxide, potassium oxide, barium oxide, silicon oxide, titanium oxide, zircon oxide, aluminum oxide, zinc oxide, and magnesium oxide.

In the method of manufacturing the electronic component 10 according to the above embodiment, the metal alkoxide 85 is not limited to the example of the above embodiment. Examples of an element with which the metal alkoxide 85 can be synthesized include Li, Be, B, C, Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Cd, In, Sn, Sb, Cs, Ba, La, Ce, Pr, Nd, Pm, Sm, Eu, Gd, Tb, Dy, Ho, Er, Tm, Yb, Lu, Hf, Ta, W, Hg, Tl, Pb, Bi, Th, Pa, U, and Pu. Alkoxides of these elements can be utilized as precursors of glass.

The metal alkoxide 85 may be, for example, sodium methoxide, sodium ethoxide, calcium diethoxide, lithium isopropoxide, lithium ethoxide, lithium tert-butoxide, lithium methoxide, boron alkoxides, potassium t-butoxide, tetraethyl orthosilicate, allyltrimethoxysilane, isobutyl (trimethoxy)silane, tetrapropyl orthosilicate, tetramethyl orthosilicate, [3-(diethylamino)propyl]trimethoxysilane, triethoxy(octyl)silane, triethoxyvinylsilane, triethoxyphenylsilane, trimethoxyphenylsilane, trimethoxymethylsilane, butyltrichlorosilane, n-propyltriethoxysilane, methyltrichlorosilane, dimethoxy(methyl)octylsilane, dimethoxydimethylsilane, tris(tert-butoxy)silanol, tris(tert-pentoxy)silanol, hexadecyltrimethoxysilane, dipotassium tris(1,2-benzenediolato-O,O')silicate, tetrabutyl orthosilicate, aluminum silicate, calcium silicate, a tetramethylammonium silicate solution, chlorotriisopropoxytitanium (IV), titanium (IV)

isopropoxide, titanium (IV) 2-ethylhexyl oxide, titanium (IV) ethoxide, titanium (IV) butoxide, titanium (IV) tert-butoxide, titanium (IV) propoxide, titanium (IV) methoxide, zirconium (IV) bis(diethyl citrato)dipropoxide, zirconium (IV) dibutoxide(bis-2,4-pentanedionate), zirconium (IV) 2-ethylhexanoate, a zirconium (IV) isopropoxide isopropanol complex, zirconium (IV) ethoxide, zirconium (IV) butoxide, zirconium (IV) tert-butoxide, zirconium (IV) propoxide, aluminum tert-butoxide, aluminum isopropoxide, aluminum ethoxide, aluminum-tri-sec-butoxide, or aluminum phenoxide.

In the method of manufacturing the electronic component 10 according to the above embodiment, a metal complex or acetate as a precursor of the metal alkoxide 85 may be used instead of the metal alkoxide 85. In this case, in the metal alkoxide charging step S17, the metal complex or acetate as the metal alkoxide precursor only needs to be charged. Examples of the metal complex include acetylacetonates such as lithium acetylacetonate, titanium (IV) oxyacetylacetonate, titanium diisopropoxide bis(acetylacetonate), zirconium (IV) trifluoroacetylacetonate, zirconium (IV) acetylacetonate, aluminum acetylacetonate, aluminum (III) acetylacetonate, calcium (II) acetylacetonate, and zinc (II) acetylacetonate. Examples of the acetate include zirconium acetate, zirconium (IV) acetate hydroxide, and basic aluminum acetate.

In the method of manufacturing the electronic component 10, the underlying electrode forming step is not limited to the example of the above embodiment. For example, after the film forming step S18, the insulating film 50 may be cured by performing a heat treatment, and then the conductor applying step S20 and the curing step S21 may be performed to form the first underlying electrode 61A and the second underlying electrode 62A. For example, when a portion of the first internal electrode 41 is exposed from the insulating film 50 as in the modification described above, the first external electrode 61 may be formed in the exposed portion by a plating method.

The curing step S21 is not limited to the step of simultaneously curing the insulating film 50 and the conductor paste. For example, when the conductor paste is a material that is cured by ultraviolet irradiation, a heating step may be performed as a curing step of curing the insulating film 50, and ultraviolet irradiation may be performed as a step of curing the conductor paste.

In the method of manufacturing the electronic component 10, the insulating film 50 may be cured by sufficiently vaporizing water and the polymer 84 in the drying step S19. In this case, the drying step S19 functions as the curing step of curing insulating film 50.

In the method of manufacturing the electronic component 10, the order of the solvent charging step S13, the catalyst charging step S14, and the base body charging step S15 is not limited. In a state where the solvent 82, the base body 20, and the polymer 84 are charged into the reaction vessel 81, the metal alkoxide 85 and the catalyst only need to start to react in the reaction vessel 81.

In the method of manufacturing the electronic component 10, the polymer 84 is not limited to polyvinylpyrrolidone. For example, the polymer 84 may be an acrylic homopolymer or copolymer of acrylic acid, methacrylic acid, or an ester thereof. Examples of the acrylic copolymer include an acrylic acid ester copolymer, a methacrylic acid ester copolymer, and an acrylic acid ester-methacrylic acid ester copolymer. Examples of the polymer 84 include homopolymers or copolymers of cellulose-based materials, polyvinyl alcohol-based materials, polyvinyl acetate-based materials, polyvinyl chloride materials, and polypropylene carbonate-based materials. Examples of the cellulose-based materials include hydroxypropyl cellulose, cellulose ether, carboxymethyl cellulose, acetyl cellulose, and acetyl nitrocellulose. In addition, the polymer 84 may contain a plurality of kinds, and only needs to contain at least one kind selected from the exemplified ones.

In the method of manufacturing the electronic component 10, the solvent 82 is not limited to 2-propanol. The solvent 82 may be appropriately changed as long as the metal alkoxide 85 can be sufficiently dispersed.

In the method of manufacturing the electronic component 10, the polymer charging step S16 may be omitted. In the electronic component 10 of Example 3 described above, the polymer charging step S16 is omitted in the formation. Even if the polymer 84 is not included, the film main body 51 and the thick film portion 52 are integrally formed in the film forming process.

The film forming method described in Japanese Patent Application Laid-Open No. 2020-36002 includes a solvent charging step, a catalyst charging step, a base body charging step, and a metal alkoxide charging step. The film forming method includes a film forming step. In the film forming step, an insulating film made of silicon oxide is formed on the outer surface of the base body by hydrolysis and polycondensation reaction of the metal alkoxide.

In the film forming method as described in Japanese Patent Application Laid-Open No. 2020-36002, the size of the silicon oxide may become excessively large in the film forming step. When silicon oxide particles having a large size exist on the surface of the insulating film, in a case where an impact from the outside of the base body is applied to the vicinity of the particles, the particles may peel off the insulating film in the vicinity from the outer surface of the base body.

Here, according to the film forming method in the method of manufacturing the electronic component 10 according to the above embodiment, the polymer 84 is charged in the polymer charging step S16. In the process of forming the insulating film 50, the polymer 84 is adsorbed to the outer surface 21 of the base body 20. Thereafter, fine particles of glass derived from the metal alkoxide 85 are incorporated into the polymer 84 in the metal alkoxide charging step S17. Then, coarse particles of excessively grown glass cannot be incorporated into the polymer 84. As a result, the insulating film 50 does not include excessively large particles.

As described above, the thick film portion 52 is not essential from the viewpoint of reducing excessive growth of coarse particles of glass. The dimensional relationship between the thick film portion 52 and the film main body 51 is also not limited to the example of the above embodiment.

The coarse particle size can be further reduced by controlling the concentration of the metal alkoxide 85, the alkali concentration, the reaction temperature, the reaction time, the type of the solvent 82, a surface charge of the base body 20, and the like.

The technical idea that can be grasped from the above embodiment and modifications will be added below.

<Supplement 1>

A film forming method for forming an insulating film including a metal oxide on an outer surface of a base body, the method including: charging the base body into a reaction vessel; charging a polymer adsorbed to the outer surface of the base body into the reaction vessel; charging a metal alkoxide or a metal alkoxide precursor into the vessel; charging a catalyst that promotes hydrolysis of the metal alkoxide into the reaction vessel; and hydrolyzing and dehydration-condensing the metal alkoxide to form the insulating film on the outer surface of the base body.

DESCRIPTION OF REFERENCE SYMBOLS

10: Electronic component
20: Base body
21: Outer surface
41: First internal electrode
42: Second internal electrode
50: Insulating film
51: Film main body
52: Thick film portion
61: First external electrode
62: Second external electrode
71: First penetration portion
72: Second penetration portion
81: Reaction vessel
82: Solvent
83: Aqueous solution
84: Polymer
85: Metal alkoxide

The invention claimed is:

1. An electronic component comprising:
a base body; and
an insulating film covering at least part of an outer surface of the base body,
wherein the insulating film includes a film main body and a plurality of thick film portions buried in the film main body,
a material of the film main body includes a glass,
a material of the plurality of thick film portions is the same as the glass of the film main body, and
a thickness of the plurality of thick film portions is larger than an average thickness of the film main body.

2. The electronic component according to claim 1, further comprising an external electrode covering a surface of the insulating film.

3. The electronic component according to claim 1, wherein the average thickness of the film main body is 30 nm to 1,000 nm.

4. The electronic component according to claim 1, wherein the average thickness of the film main body is 0.15 times to 0.91 times an average value of a maximum thickness of the plurality of thick film portions.

5. The electronic component according to claim 1, wherein, in a section of the insulating film orthogonal to the outer surface of the base body, a maximum width of the plurality of thick film portions is 0.7 times to 4.0 times a maximum thickness of the plurality of thick film portions.

6. The electronic component according to claim 1, wherein the glass is silicon dioxide.

7. The electronic component according to claim 1, wherein the plurality of thick film portions and the film main body are integrated.

8. The electronic component according to claim 1, wherein a maximum thickness of at least some of the plurality of thick film portions is less than 6.5 times the average thickness of the film main body.

9. The electronic component according to claim 1, wherein a maximum thickness of all of the plurality of thick film portions is less than 6.5 times the average thickness of the film main body.

10. The electronic component according to claim 1, wherein the glass is selected from multicomponent oxides containing Si, multicomponent oxides containing an alkali metal and Si, and multicomponent oxides containing an alkaline earth metal and Si.

11. The electronic component according to claim 1, wherein, in each of the plurality of thick film portions, a portion thereof protrudes to a side opposite to the base body with respect to the film main body.

12. The electronic component according to claim 1, wherein the plurality of thick film portions have a dome shape as a whole.

13. The electronic component according to claim 1, wherein the plurality of thick film portions and the film main body are integrated such that there is no clear boundary therebetween.

14. An electronic component comprising:
a base body; and
an insulating film covering at least part of an outer surface of the base body,
wherein the insulating film includes a film main body and a plurality of thick film portions buried in the film main body,
a material of the film main body includes a glass,
a material of the plurality of thick film portions is the same as the glass of the film main body, and
a thickness of the plurality of thick film portions is larger than an average thickness of the film main body,
the outer surface of the base body includes a planar first surface, a second surface adjacent to the first surface and expanding in a direction different from the first surface, and a boundary surface including a curved surface at a boundary between the first surface and the second surface,
an angle on the base body side among angles formed by the first surface and the second surface is less than 180 degrees, and
in a section orthogonal of the insulating film to the first surface and the second surface, a first average thickness of the insulating film covering the boundary surface is larger than a second average thickness of the insulating film covering the first surface.

* * * * *